US011148848B2

(12) United States Patent
Guertin

(10) Patent No.: US 11,148,848 B2
(45) Date of Patent: *Oct. 19, 2021

(54) RECYCLABLE COMPOSITE CONTAINER

(71) Applicant: Richard Guertin, Quebec (CA)

(72) Inventor: Richard Guertin, Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/731,198

(22) Filed: Dec. 31, 2019

(65) Prior Publication Data

US 2020/0130886 A1  Apr. 30, 2020

Related U.S. Application Data

(63) Continuation of application No. 15/526,970, filed as application No. PCT/CA2015/051192 on Nov. 16, 2015, now Pat. No. 10,526,105.

(Continued)

(51) Int. Cl.
*B32B 1/02* (2006.01)
*B65D 3/04* (2006.01)
(Continued)

(52) U.S. Cl.
CPC .......... *B65D 3/268* (2013.01); *B32B 1/02* (2013.01); *B65D 3/04* (2013.01); *B65D 3/22* (2013.01); *B65D 3/26* (2013.01); *B65D 15/08* (2013.01); *B65D 23/00* (2013.01); *B65D 25/2852* (2013.01); *B65D 51/20* (2013.01); *B44D 3/12* (2013.01); *B65D 2251/0018* (2013.01); *B65D 2251/0093* (2013.01)

(58) Field of Classification Search
CPC .... B32B 1/02; B65D 3/00; B65D 3/02; B65D 3/04; B65D 3/10; B65D 3/22; B65D 3/26; B65D 3/268; B65D 15/08

See application file for complete search history.

(56) References Cited

U.S. PATENT DOCUMENTS 10,526,105 B2 *  1/2020  Guertin .............. B65D 23/00

OTHER PUBLICATIONS

Definition of "abut", Werriam-Webster Online Dictionary, accessed Aug. 30, 2020.*

* cited by examiner

*Primary Examiner* — Walter Aughenbaugh

(74) *Attorney, Agent, or Firm* — McCormick, Paulding & Huber PLLC

(57) ABSTRACT

A composite container having a paperboard hollow body with top and bottom open ends. The body is formed by a sidewall with inner and outer surfaces. The composite container includes a body liner extending peripherally about the inner surface of the body and a base connectable to the bottom open end of the hollow body. The base includes a sidewall sized and shaped to fit snugly within the bottom open end of the body. The sidewall is permanently coupled to a bottom portion of the liner. The composite container also includes a collar connectable to the top open end of the hollow body. The collar has a peripheral portion that abuts the top open end and an inner circumferential flange sized and shaped to fit snugly within the top open end of the body. The inner circumferential flange is permanently coupled to a top portion of the liner. The peripheral portion has regions of weakened strength so that the section of the peripheral portion that abuts the top open end can be removed, thereby allowing a user to rapidly remove the coupled collar, liner and base from the hollow body.

23 Claims, 31 Drawing Sheets

Related U.S. Application Data

(60) Provisional application No. 62/079,637, filed on Nov. 14, 2014.

(51) Int. Cl.
    *B65D 3/26*     (2006.01)
    *B65D 23/00*     (2006.01)
    *B65D 25/28*     (2006.01)
    *B65D 51/20*     (2006.01)
    *B65D 3/22*     (2006.01)
    *B65D 8/00*     (2006.01)
    *B44D 3/12*     (2006.01)

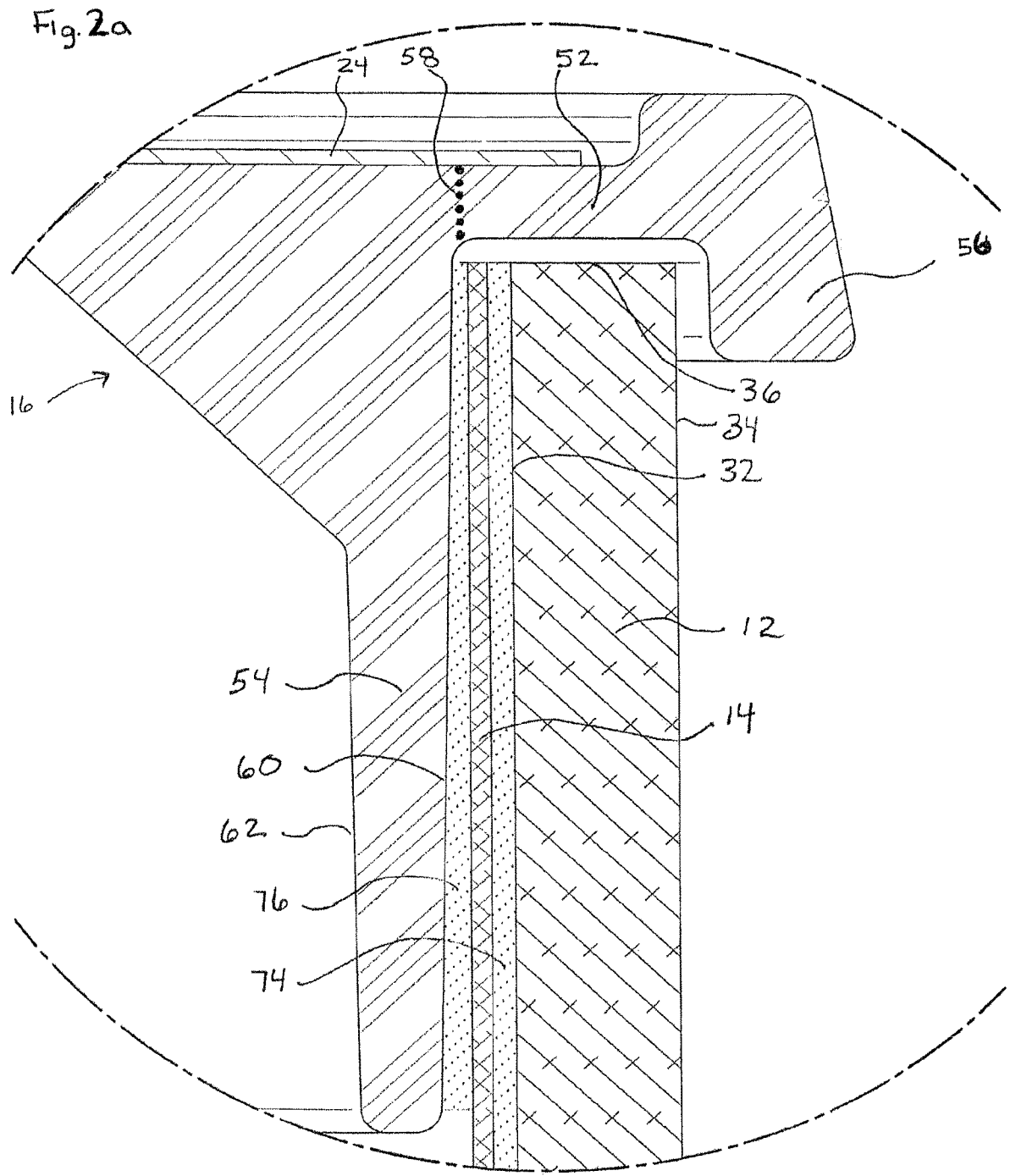

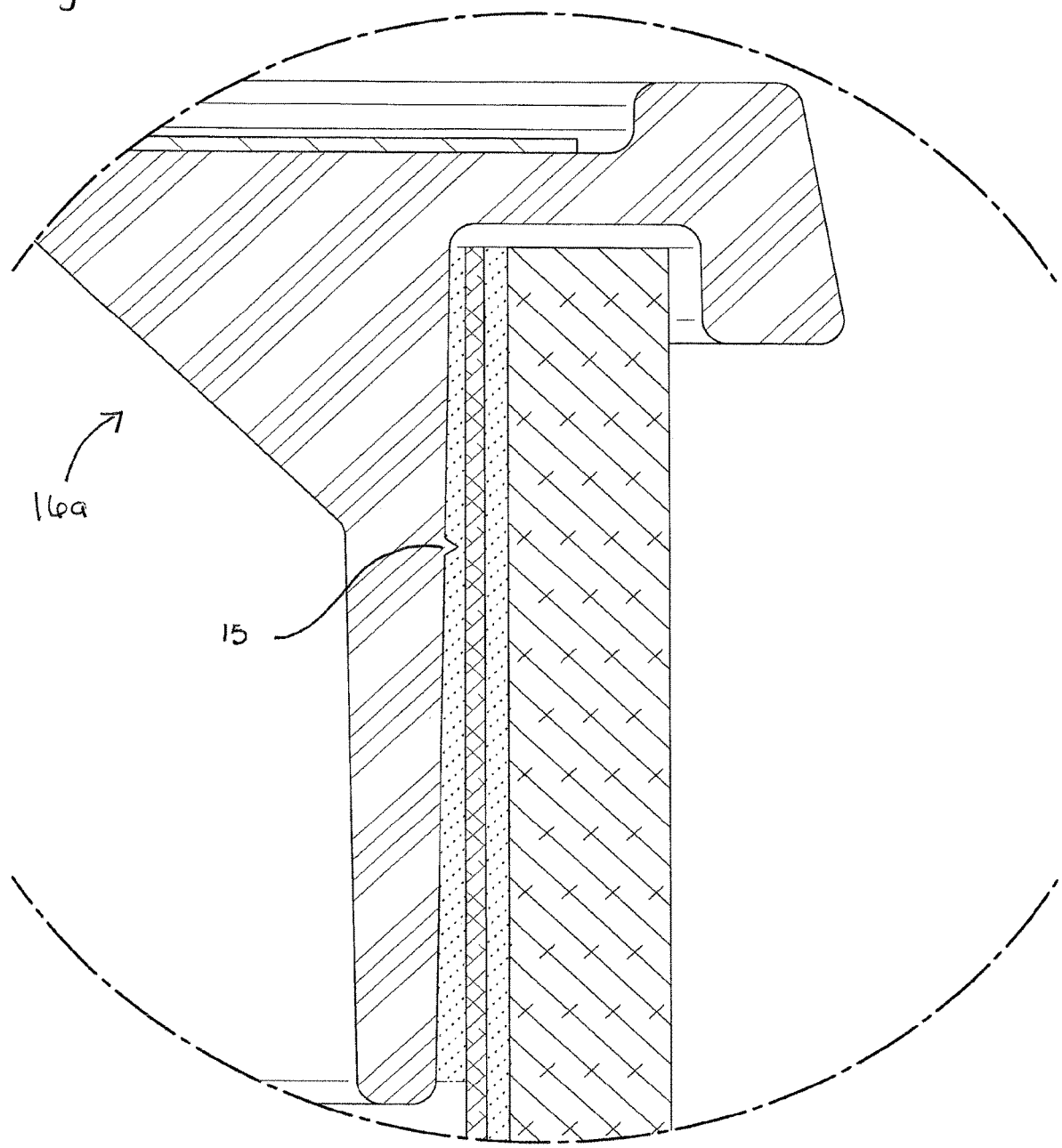

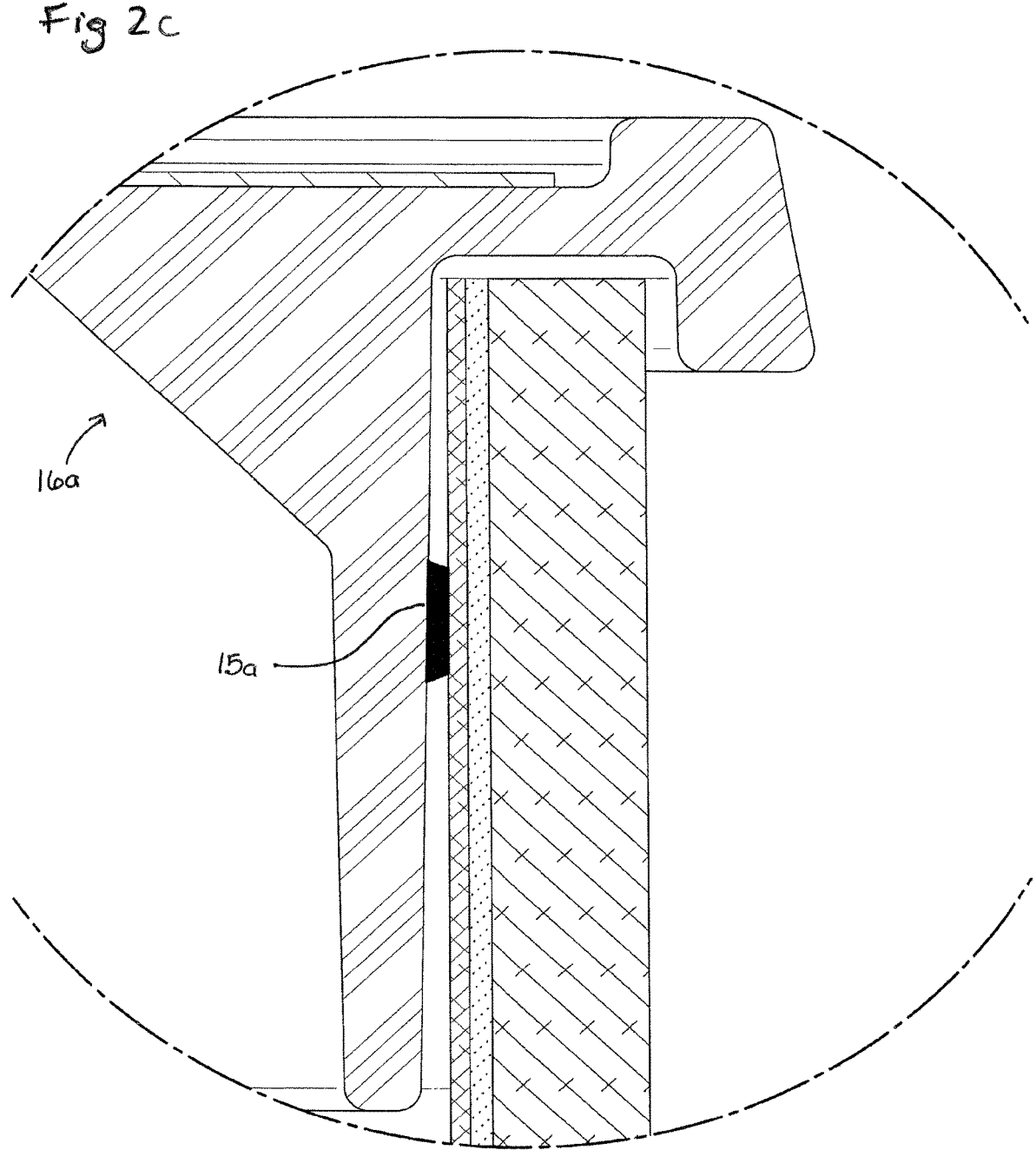

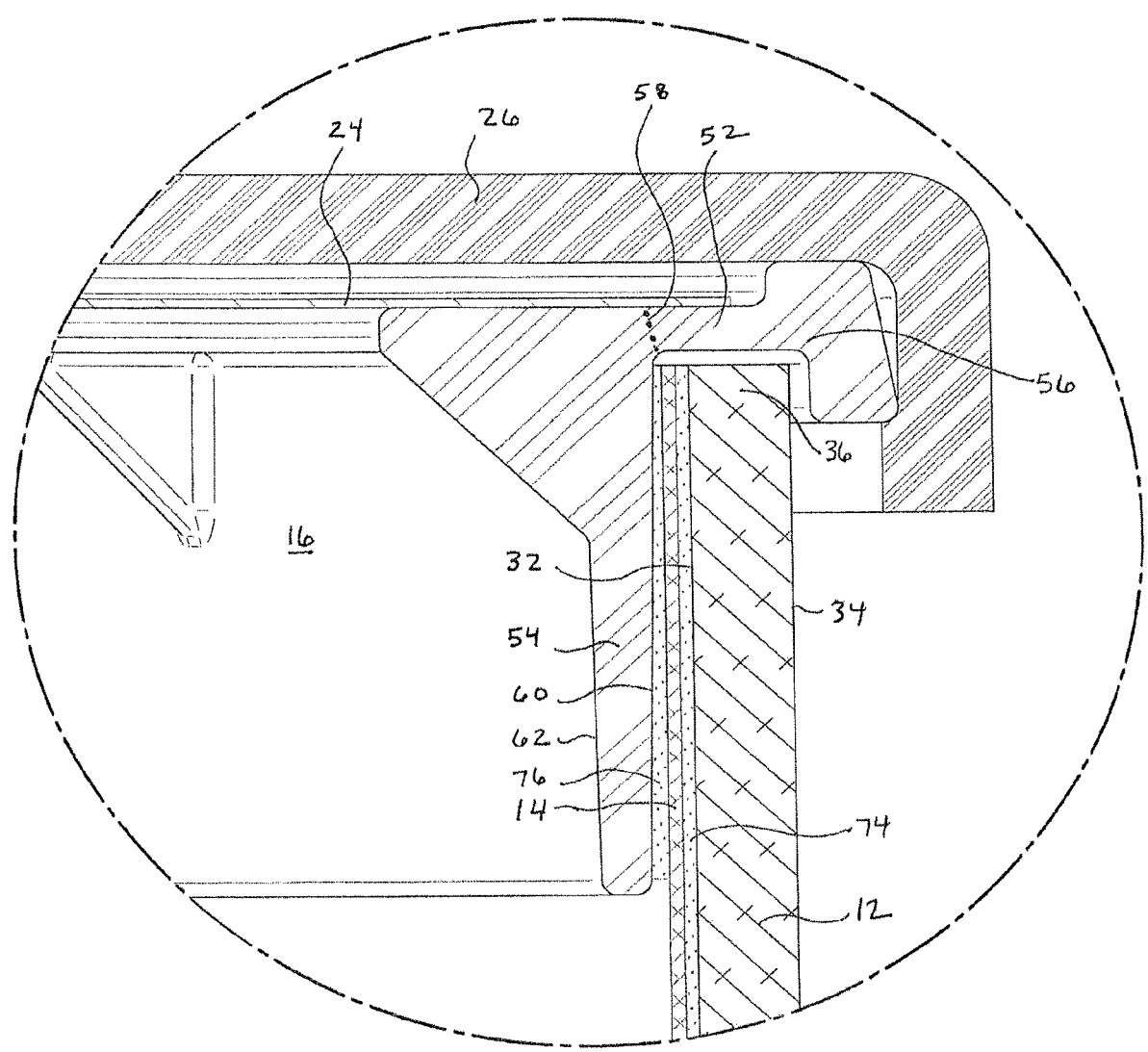

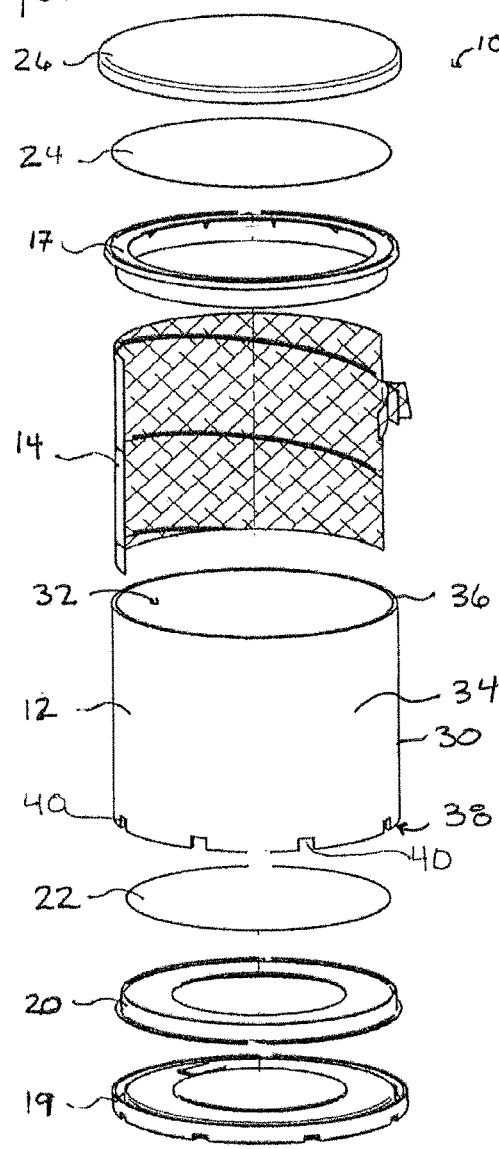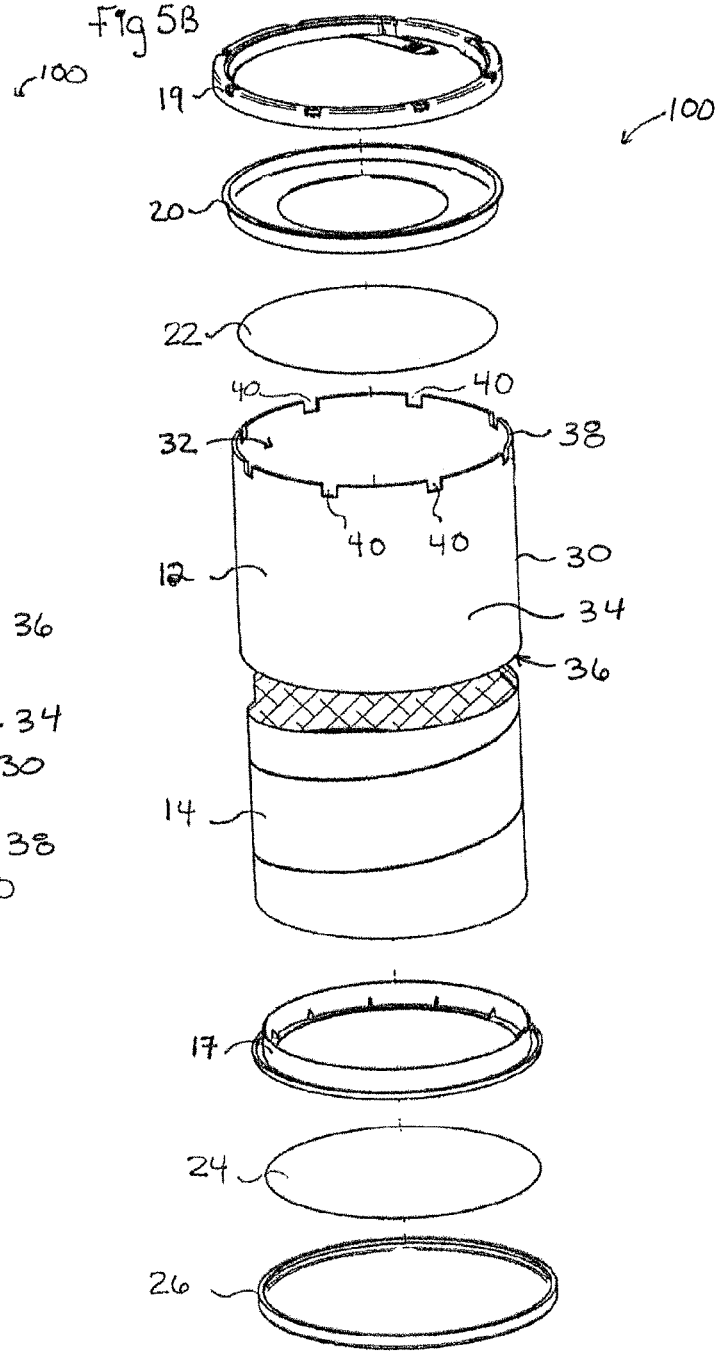

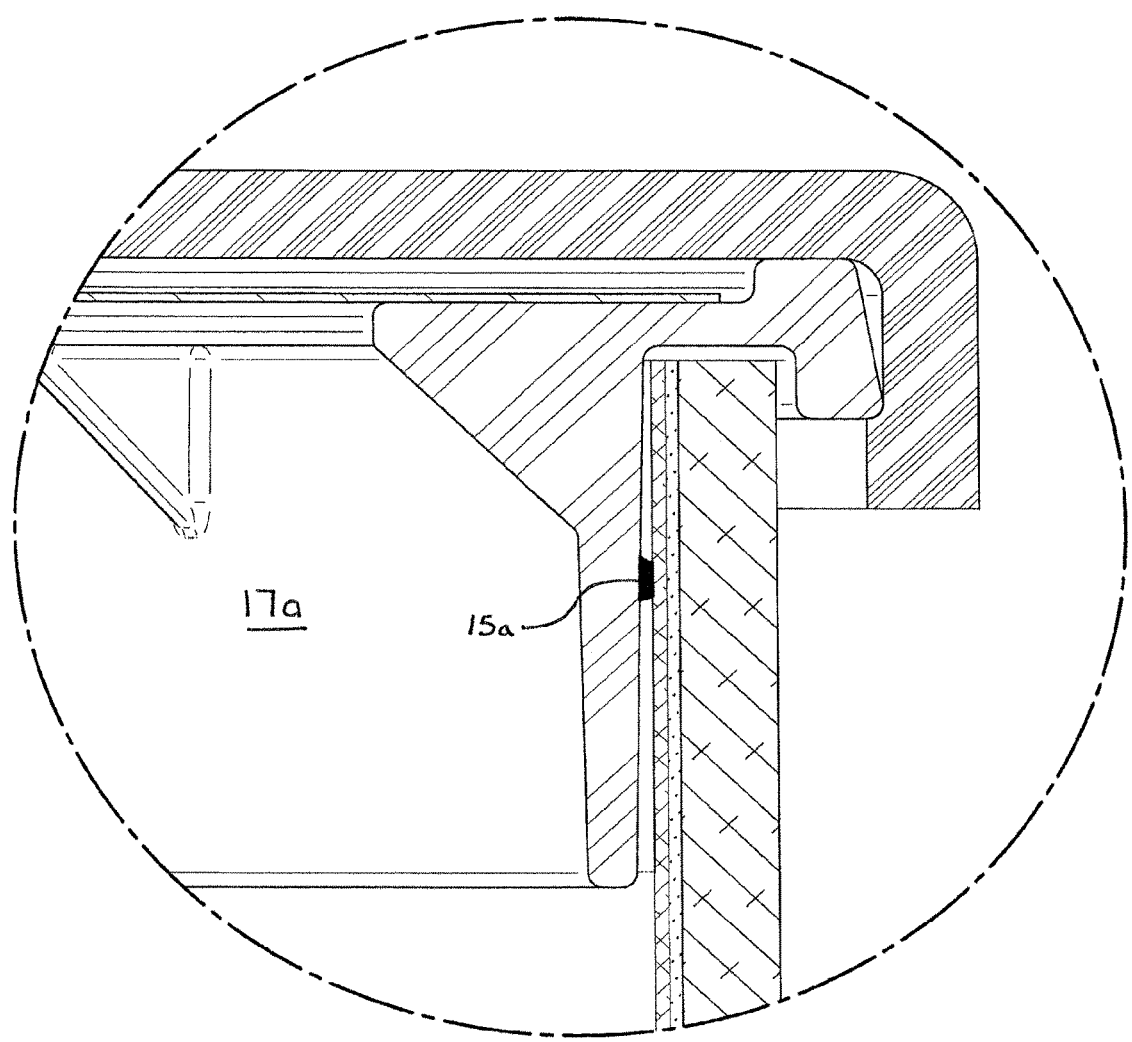

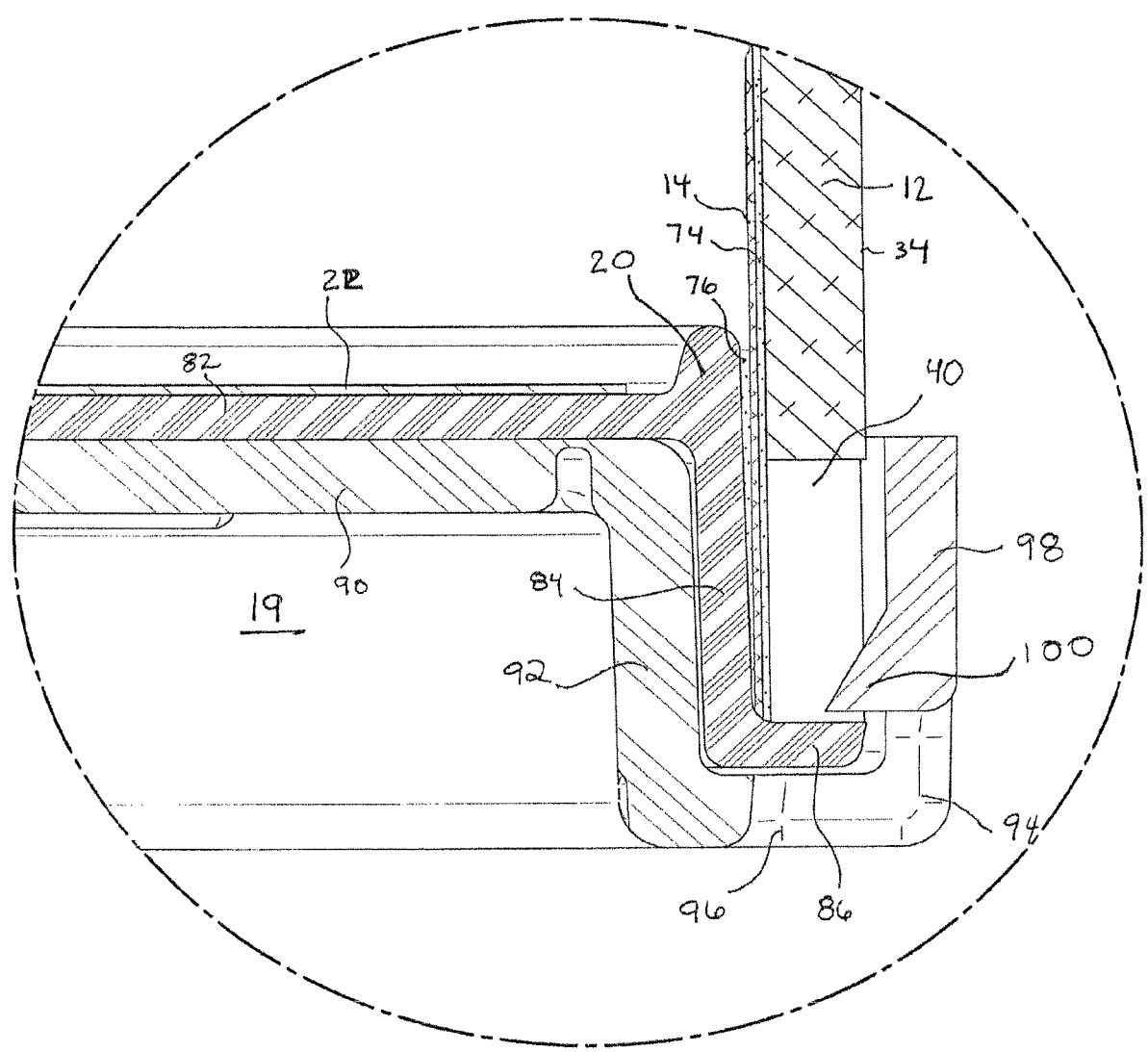

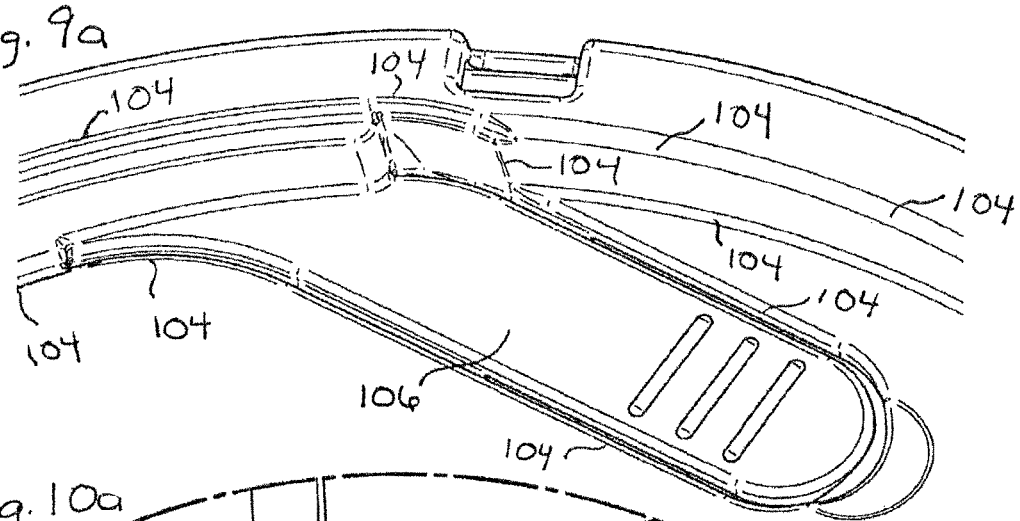
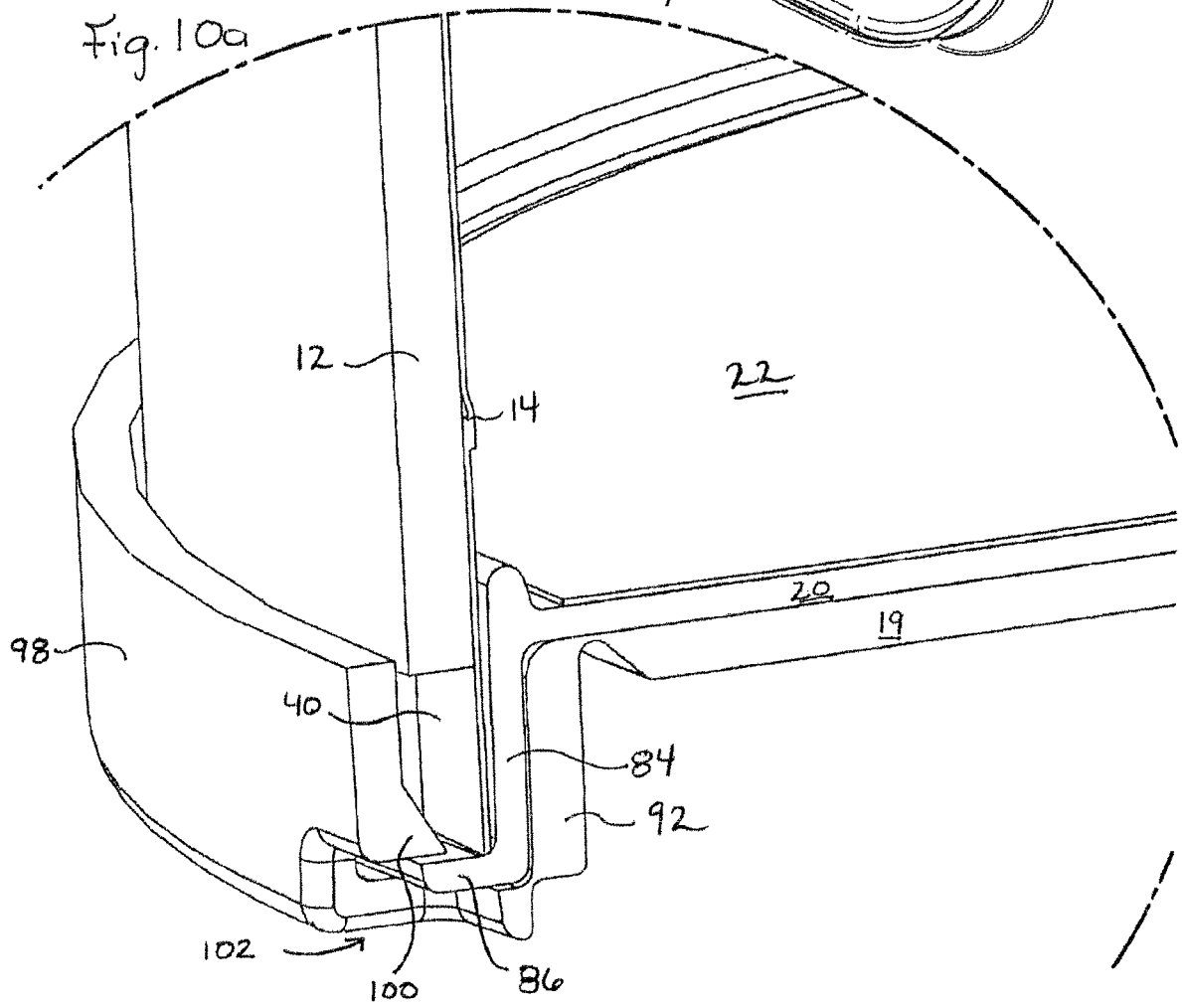

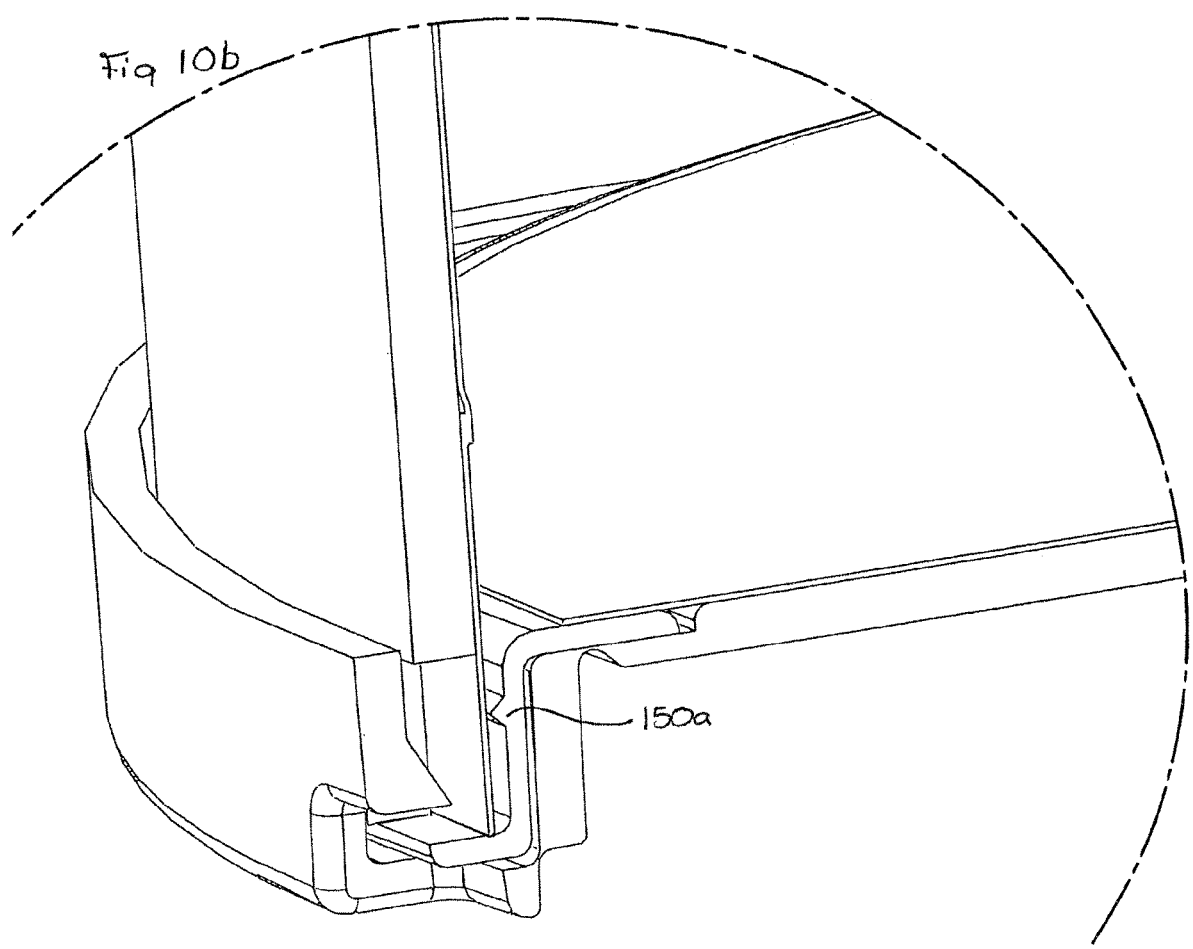

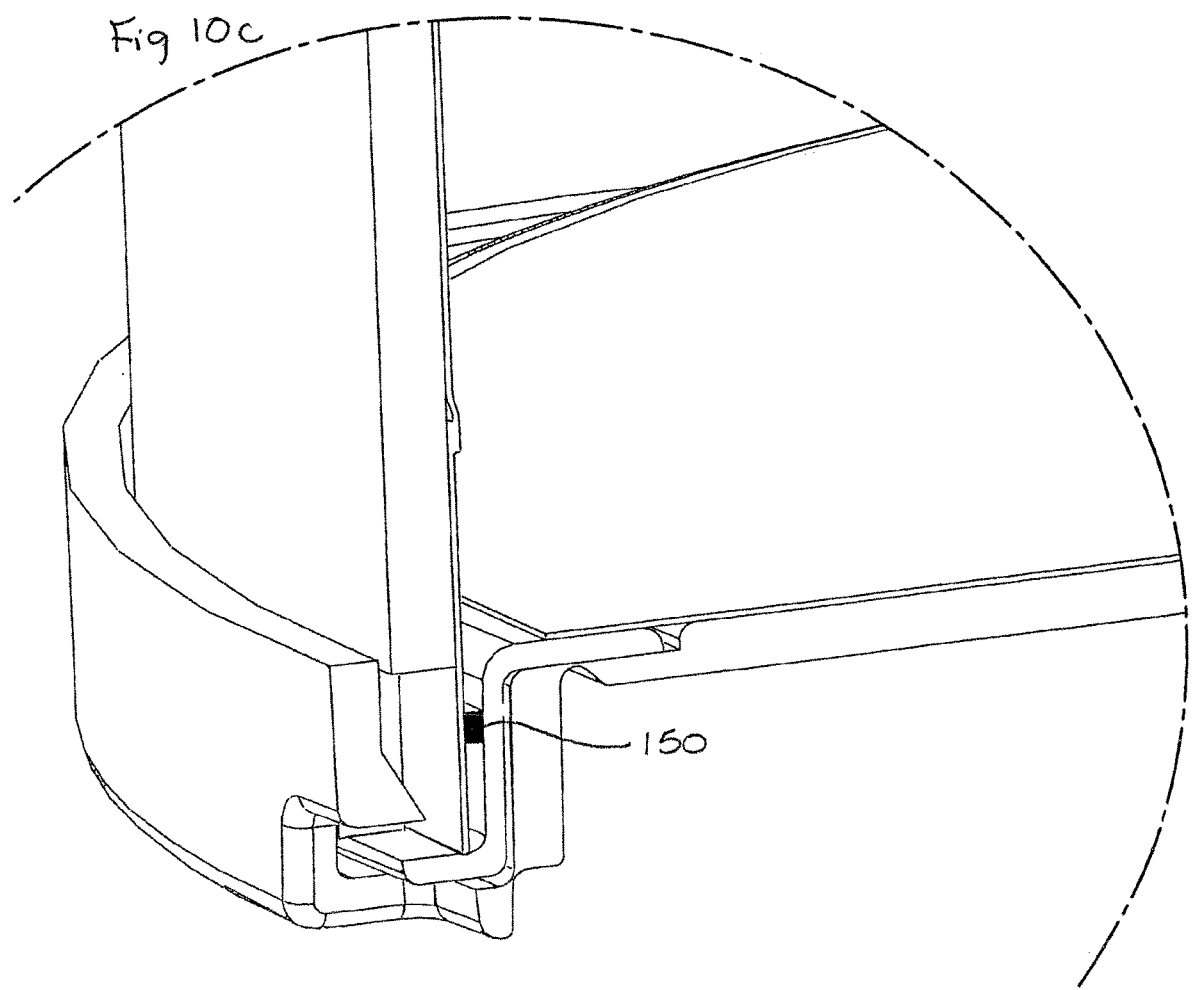

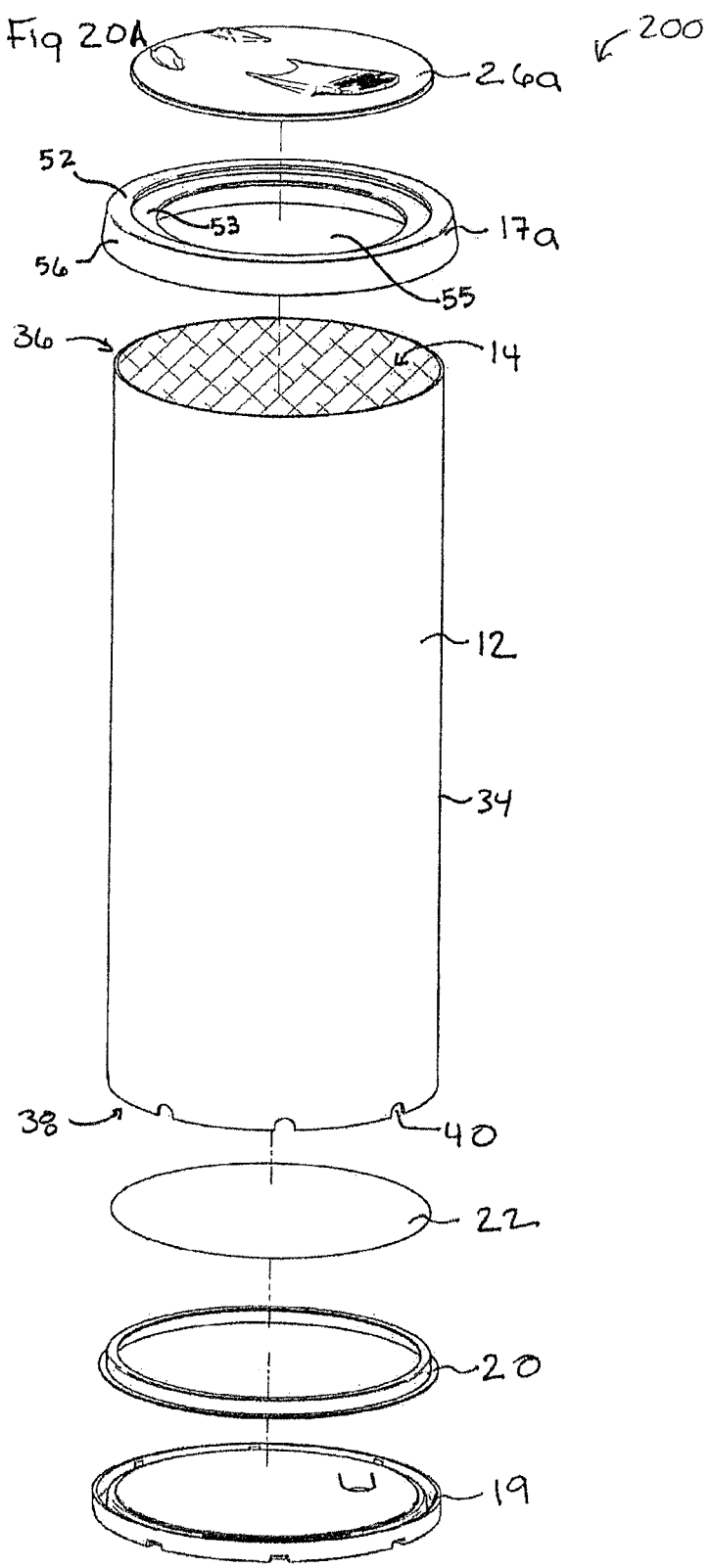

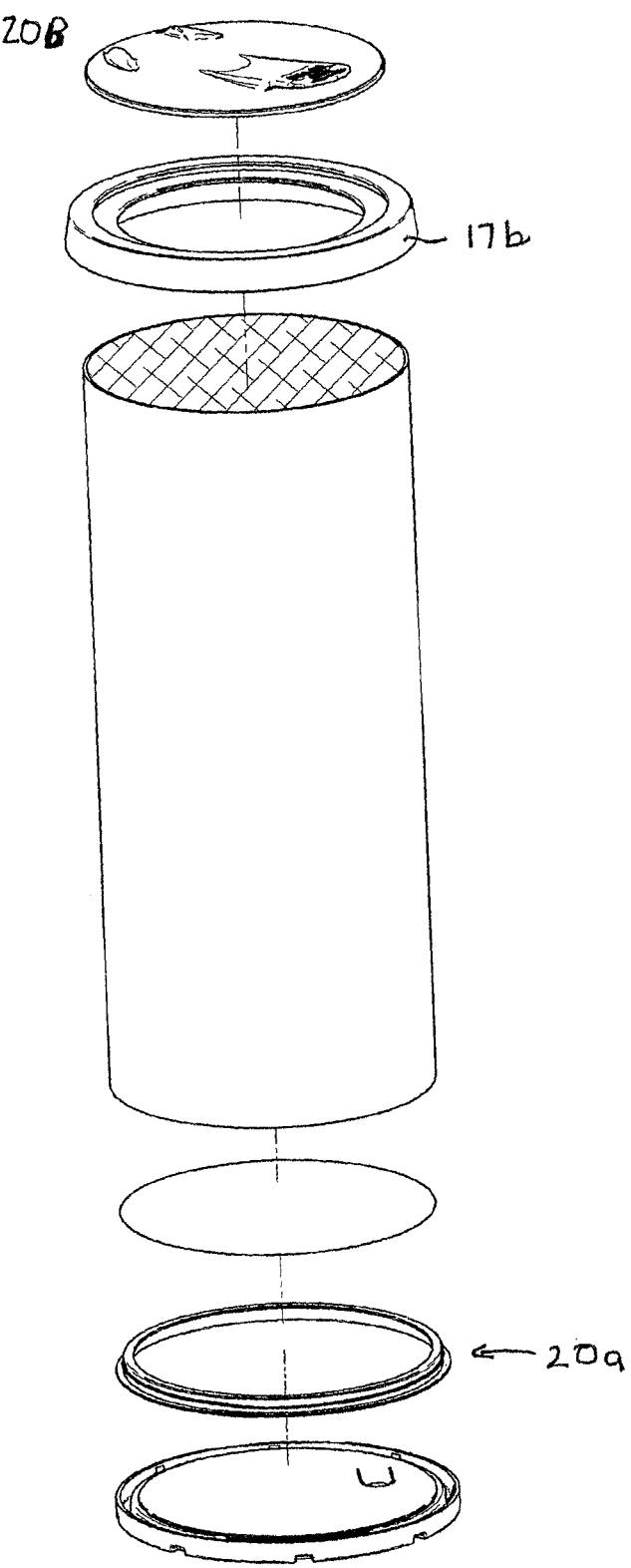

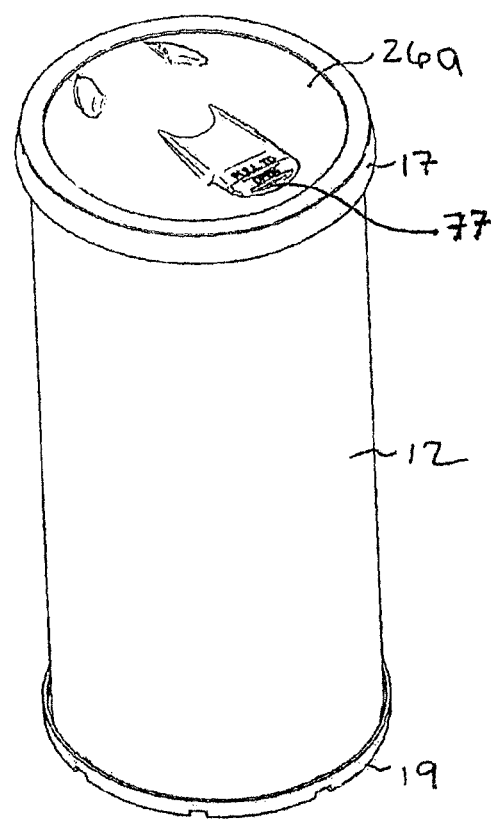

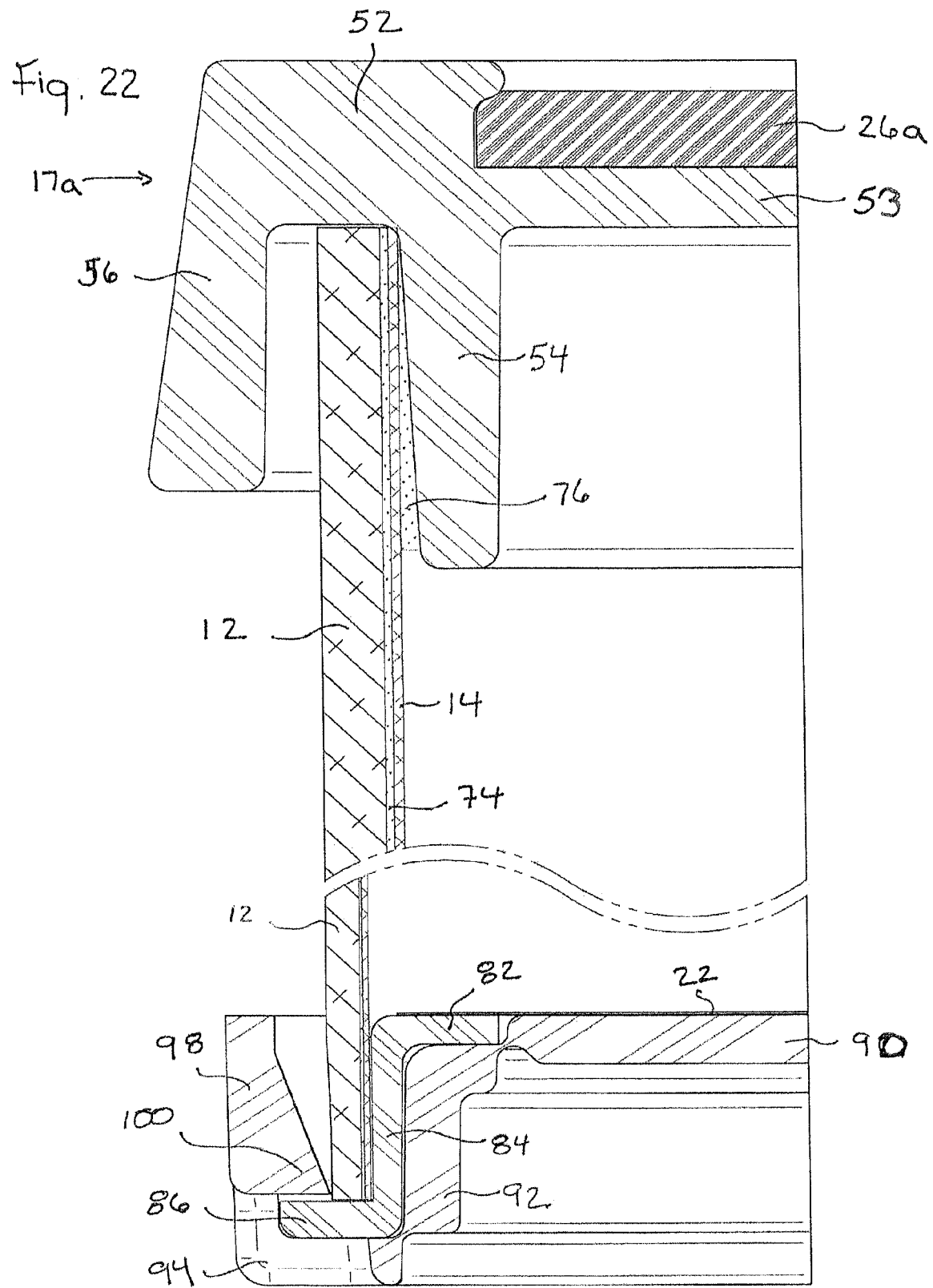

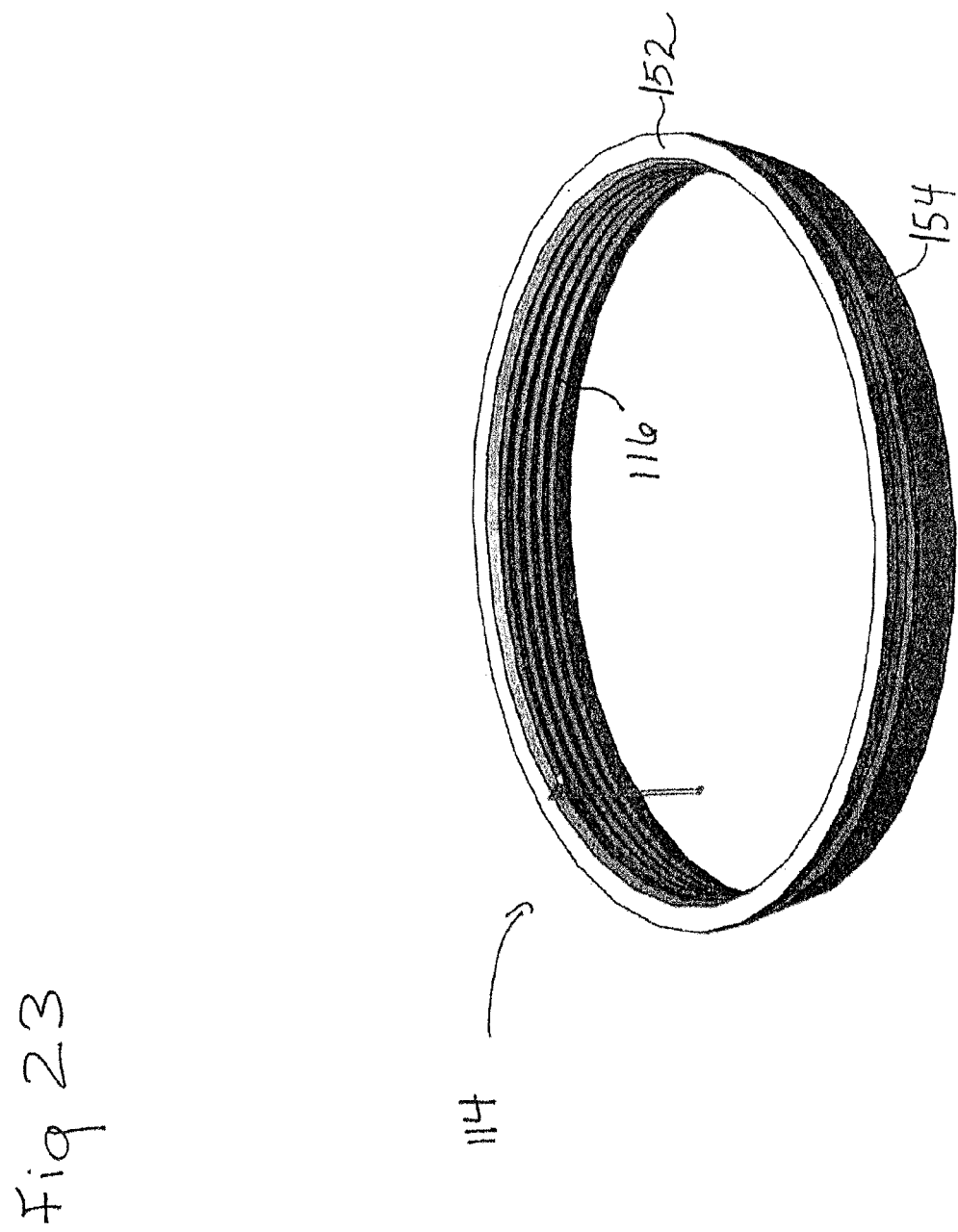

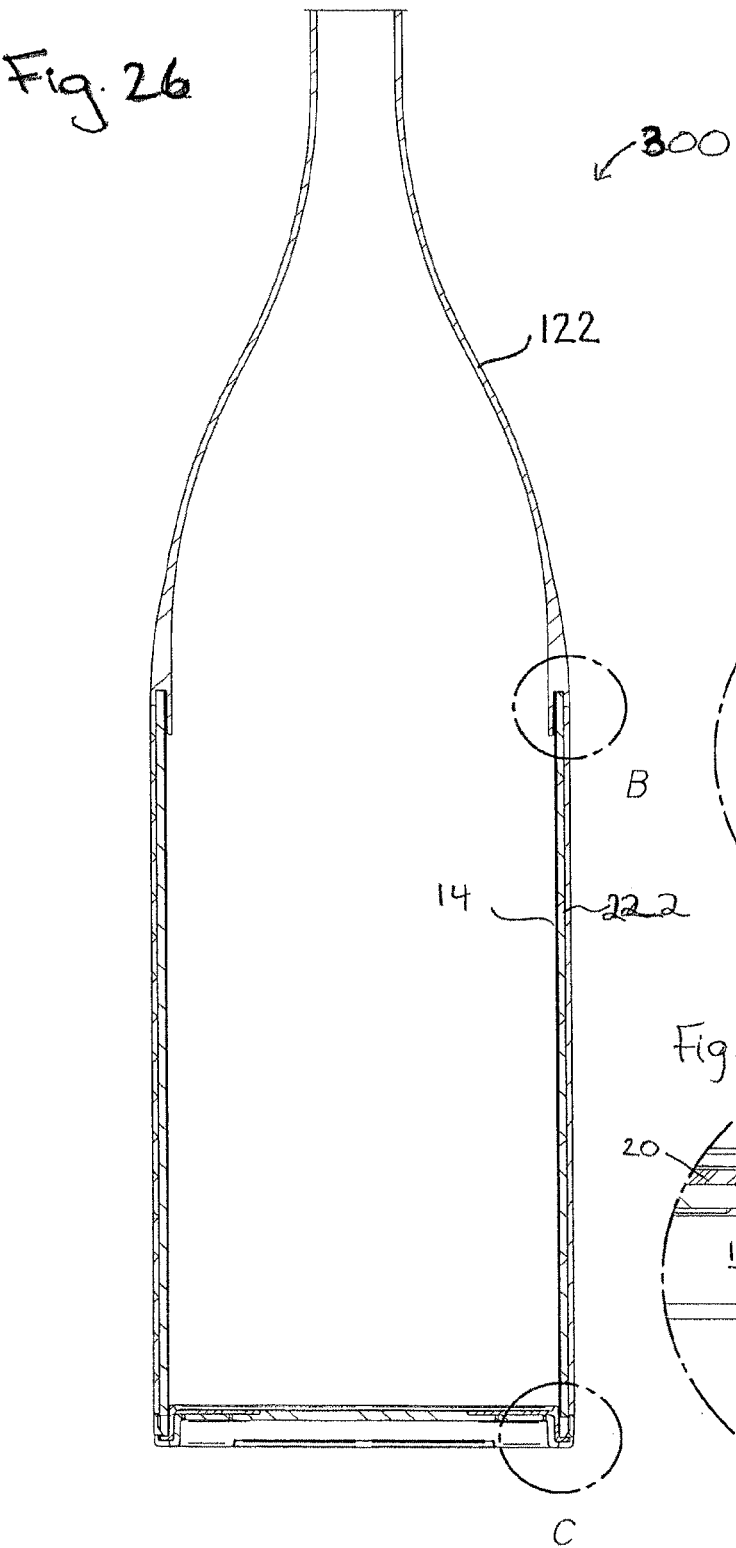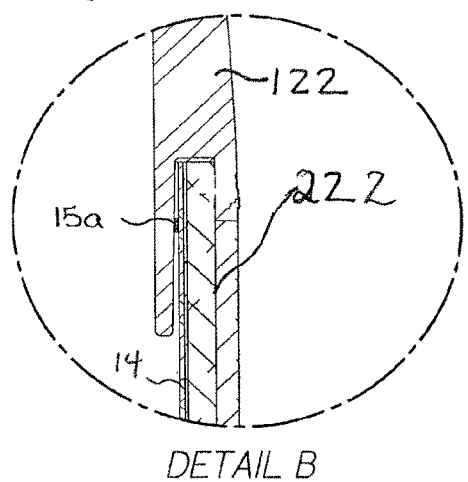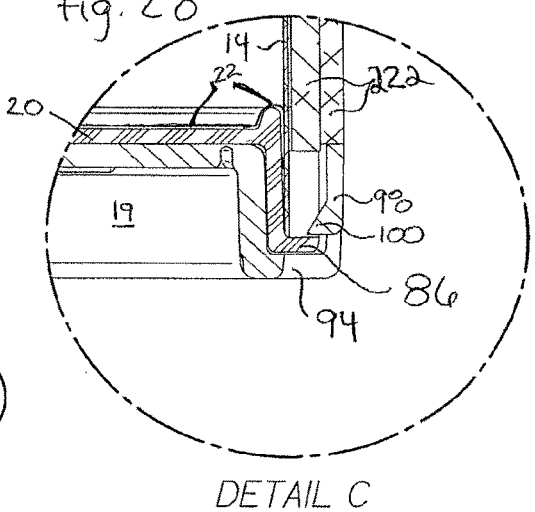

RECYCLABLE COMPOSITE CONTAINER

CROSS-REFERENCE TO RELATED APPLICATIONS

This application is a continuation of U.S. patent application Ser. No. 15/526,970 filed May 15, 2017 entitled to the benefit of and incorporates by reference essential subject matter disclosed in International Patent Application No. PCT/CA2015/051192 filed on Nov. 16, 2015, which claims priority from U.S. provisional patent application 62/079,637, filed Nov. 14, 2014, each of which is incorporated herein by reference in its entirety.

TECHNICAL FIELD

The present invention generally relates to composite containers which can be disassembled and the components thereof recycled and to methods of manufacturing these composite containers.

BACKGROUND

Many containers to store beverage, canned fruits and vegetables, paints and the like were and are still today made of aluminum or tinplate. These containers are built to rigid enough to withstand a certain amount of stacking and rough handling during shipping. With the rise of the prices of metals the industry has turn to less expensive materials such as plastics and paperboard.

Composite containers that include a layer of paperboard or other paper substrate held within metal ends have been used for packaging a wide variety of viscous, semi-solid or solid materials, such as paints, snacks, powders, foods, beverages and other perishable items.

The inner surfaces of the paperboard in these composite containers is typically protected by coating the paperboard with a barrier layer of thermoplastic material, or by permanently attaching various UV light, oxygen and/or moisture barrier layers to the paperboard. The options of coating the paperboard body of the composite container with a barrier layer of thermoplastic material or adhesively securing various UV light, oxygen and moisture barrier layers to the paperboard to avoid certain of the drawbacks of using plastic bags discussed above, however, the paperboard would require an expensive hydra-pulping process in order to separate the paper and plastic components. Many jurisdictions also charge a recycling fee for using such plastic coated containers which require an additional step in order to be fully broken down into components that can be individually recycled.

For certain applications such as paint cans, it has also been taught to insert a plastic bag to protect the interior surface of the container such as in U.S. Pat. No. 4,298,134. This technique has the advantage of generally being easy to disassemble from the container. Some of the drawbacks of using plastic bags are that they don't generally conform to the full perimeter of the container and can result in undesired air pocket between the plastic bag and the wall of the container or bunching, folding over, tearing of the plastic bag inside the container. The composite container may also be difficult or impractical to disassemble into its components if the bottom of the bag is adhesively secured to the metal or plastic base of the container.

A further problem generally with composite containers is that one or more of the metal or plastic end pieces remain attached in whole or in part to the paperboard body after the container is opened. The complete disassembly of the composite container into components that can be individual recycled is therefore not possible or can be a difficult or tedious task to accomplish by the consumer.

Accordingly, it would be desirable to provide a low cost composite container and a method for manufacturing such a container which can be easily broken down and separated into material groups that require separate recycling.

This background information is provided for the purpose of making known information believed by the applicant to be of possible relevance to the present invention. No admission is necessarily intended, nor should be construed, that any of the preceding information constitutes prior art against the present invention.

SUMMARY

An object of the present invention is to provide recyclable composite container. In accordance with an aspect of the present invention, there is provided a composite container having a paperboard hollow body with top and bottom open ends. The body is formed by a sidewall with inner and outer surfaces. The composite container includes a body liner extending peripherally about the inner surface of the body and a base connectable to the bottom open end of the hollow body. The base includes a sidewall sized and shaped to fit snugly within the bottom open end of the body. The sidewall is permanently coupled to a bottom portion of the liner. The composite container includes a collar connectable to the top open end of the hollow body. The collar has a peripheral portion that abuts the top open end and an inner circumferential flange sized and shaped to fit snugly within the top open end of the body. The inner circumferential flange is permanently coupled to a top portion of the liner. The peripheral portion has regions of weakened strength so that the section of the peripheral portion that abuts the top open end can be removed, thereby allowing a user to rapidly remove the coupled collar, liner and base from the hollow body by pulling on the base.

In accordance with another aspect of the present invention, there is provided a composite container having a paperboard hollow body having top and bottom open ends. The body is formed by a sidewall having inner and outer surfaces. The composite container includes a body liner extending peripherally about the inner surface of the body. The collar is connectable to the top open end of the body. The collar has a peripheral portion that abuts the top open end and an inner circumferential flange sized and shaped to fit snugly within the top open end of the body. The inner circumferential flange is permanently coupled to a top portion of the liner. The framing element is connectable to the bottom open end of the body. The framing element has a sidewall sized and shaped to fit snugly within the bottom open end of the body and a peripheral rim that receives the bottom open end of the body. The sidewall is permanently coupled to a bottom portion of the liner. The container also includes a base connectable to the framing element. The base has a top wall and sidewall designed to fit within the sidewall of the framing element, and a peripheral lip with projections to retain the peripheral rim of the framing element. The peripheral lip having regions of weakened strength so that the base can be removed by engaging the regions of weakened strength, thereby allowing a user to rapidly remove the coupled collar, liner and framing element from the hollow body by pulling on the collar.

BRIEF DESCRIPTION OF THE DRAWINGS

These and other features of the invention will become more apparent in the following detailed description in which reference is made to the appended drawings.

FIG. 2A is a detailed cross-sectional view of a top portion of the composite container 10 shown in FIG. 1A (without lid).

FIG. 2B is a detailed cross-sectional view of a top portion of the composite container 10 shown in FIG. 1B (without lid).

FIG. 2C is a detailed cross-sectional view of a top portion of the composite container 10 shown in FIG. 1B (without lid).

FIG. 3A is a detailed cross-sectional view of a top portion of the composite container 10 shown in FIG. 1A (with lid).

FIG. 5A is an exploded view of a composite container according to an embodiment of the invention.

FIG. 5B is an exploded view of a composite container according to the embodiment of the invention shown in FIG. 5A in upside down view.

FIG. 6B is a detailed cross-sectional view of a top portion of the composite container according to the embodiment of the invention shown in FIGS. 5C and 5D.

FIG. 8A is a detailed cross-sectional view of a bottom portion of the composite container according to the embodiment of the invention shown in FIGS. 5A and 5B.

FIG. 9A, is a perspective view of a portion of the bottom of the base of the composite container according to the embodiment of the invention shown in FIGS. 5A to 5D.

FIG. 10A is a detailed cross-sectional view of a bottom portion of the composite container according to the embodiment of the invention shown in FIGS. 5A and 5B.

FIG. 10B is a detailed cross-sectional view of a bottom portion of the composite container according to the embodiment of the invention shown in FIGS. 5C and 5D.

FIG. 10C is a detailed cross-sectional view of a bottom portion of the composite container according to the embodiment of the invention shown in FIGS. 5C and 5D.

FIG. 20A is an exploded view of a composite container according to an embodiment of the invention.

FIG. 20B is an exploded view of a composite container according to an embodiment of the invention.

FIG. 21 is perspective view of the composite container according to an embodiment of the invention.

FIG. 22 is a detailed cross-sectional view of a portion of the composite container shown according to the embodiment of the invention shown in FIG. 20A.

FIG. 23 is a perspective view of a collar according to an embodiment of the invention.

FIG. 26 is a perspective view of a portion of a composite container according to another embodiment of the invention.

FIG. 27 is a detailed cross-sectional view of a portion of a composite container of FIG. 26.

FIG. 28 is a detailed cross-sectional view of a portion of a composite container of FIG. 26.

DETAILED DESCRIPTION

Figure 1A:
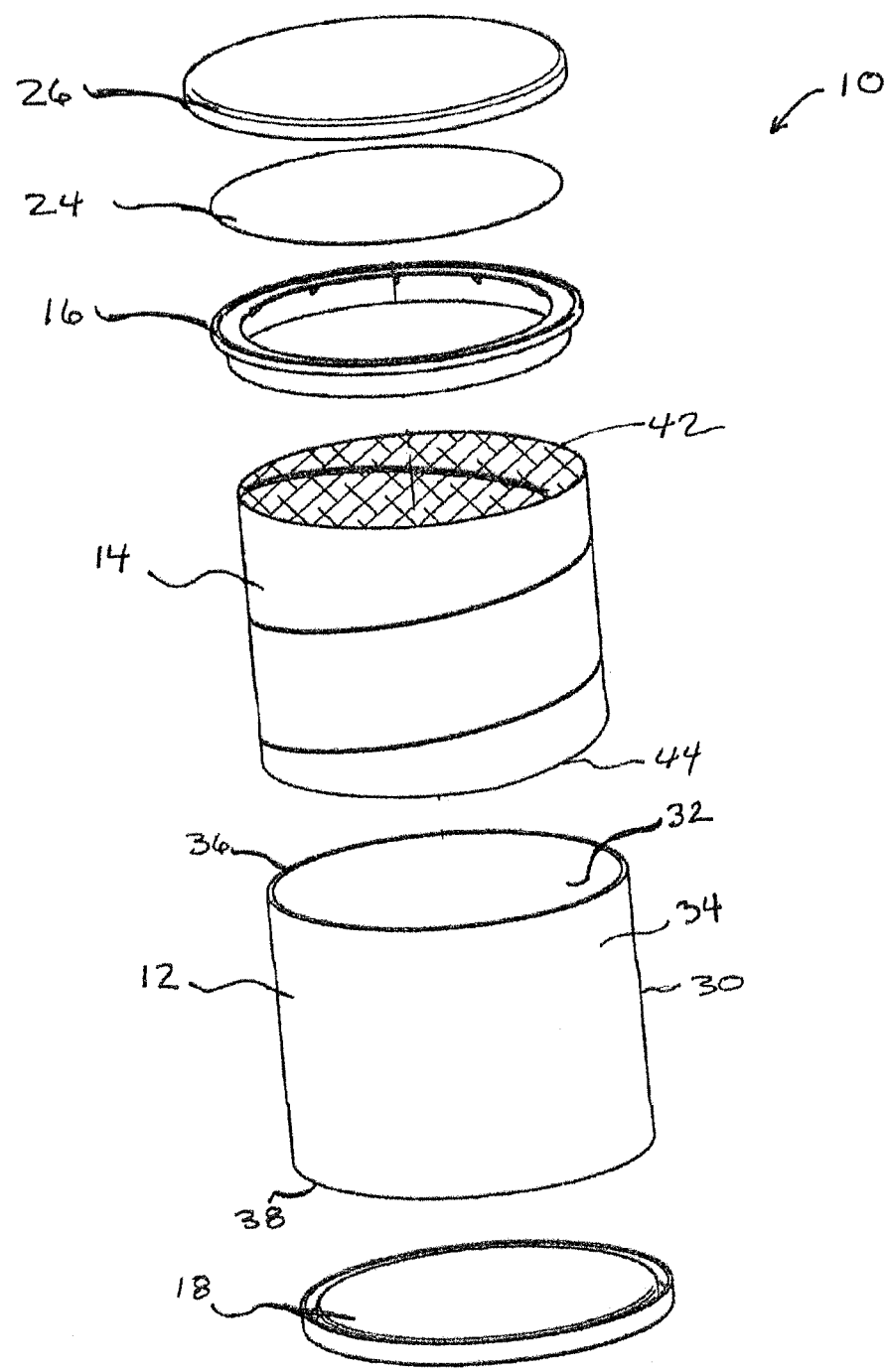
FIG. 1A is an exploded view of a composite container according to an embodiment of the invention.
Figure 1B:
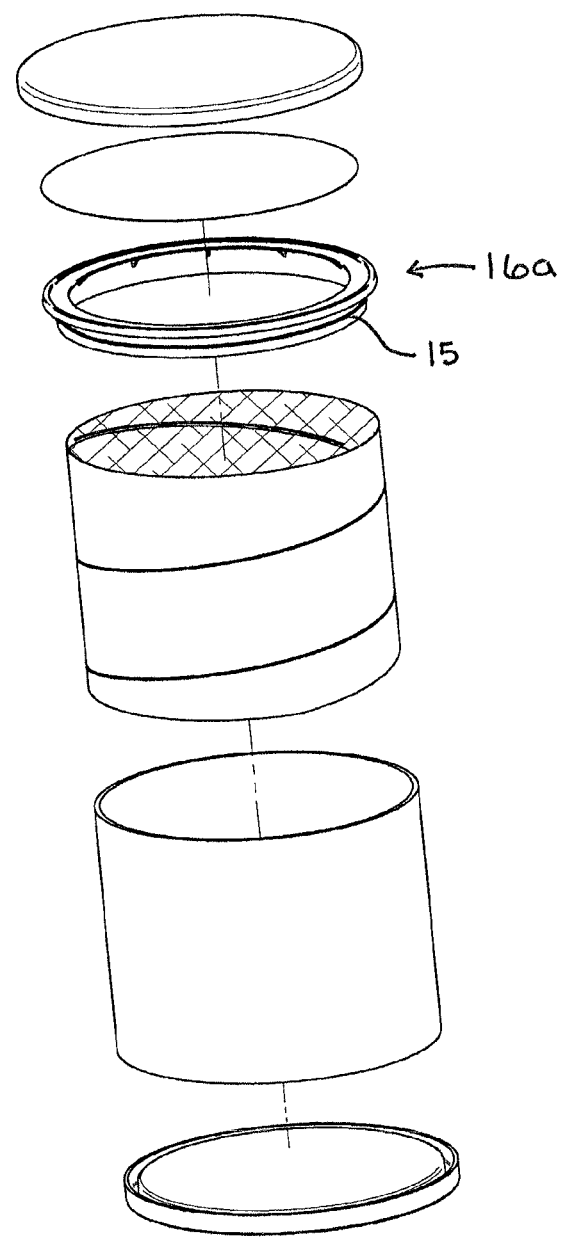
FIG. 1B is an exploded view of a composite container according to another embodiment of the invention.

In the following description, similar features in the drawings have been given similar reference numerals. It will be appreciated that the positional descriptions such as "top", "bottom" and the like should, unless otherwise indicated, be taken in the context of the figures and should not be considered limiting. Unless defined otherwise, all technical and scientific terms used herein have the same meaning as commonly understood by one of ordinary skill in the art to which this invention belongs.

To gain a better understanding of the invention described herein, the following examples are set forth. It will be understood that these examples are intended to describe illustrative embodiments of the invention and are not intended to limit the scope of the invention in any way.

EXAMPLES

Example 1

With reference to FIG. 1A to 4, a first composite container 10 is shown. The container 10 includes a hollow body 12, a liner 14, a collar 16 and base 18. The container 10 optionally includes a top liner 24, a bottom liner 22 and lid 26.

As illustrated, the hollow body 12 has a single sidewall 30 in the shape of a cylinder with an interior wall 32, an exterior wall 34, a top open end 36 and a bottom open end 38. The top open end 36 and a bottom open end 38 may have a substantially similar cross section as the sidewall 30. While the body 12 shown is a tubular shape, the body may have any shape of cross-section such as circular, rectangular, square, triangular, or oval. The body 12 is typically formed by convoluting or spiraling plies of paperboard. The body 12 can be any size.

The wall liner or body liner 14 may comprise one or more protective layers to protect the body 12 and prevent the passage of light, moisture and/or gasses into and out of the container 10, as in known in the art depending on the product that will be held within the container 10. The layers may comprise thermoplastic materials (for example, polyethylene and polypropylene) and oxygen inhibiting materials such as metalized film and aluminum foil. The wall liner 14 includes a top edge 42 and bottom edge 44. The wall liner 14 extends peripherally about the interior wall 32 of the body 12 and fully conforms to the shape and dimensions of the interior wall 32.

The top collar 16 sized and shaped for snugly fitting over the top open end 36 of the body 12 and the liner 14. The collar 16 is designed to provide structural support to the body 12.

Figure 3B:
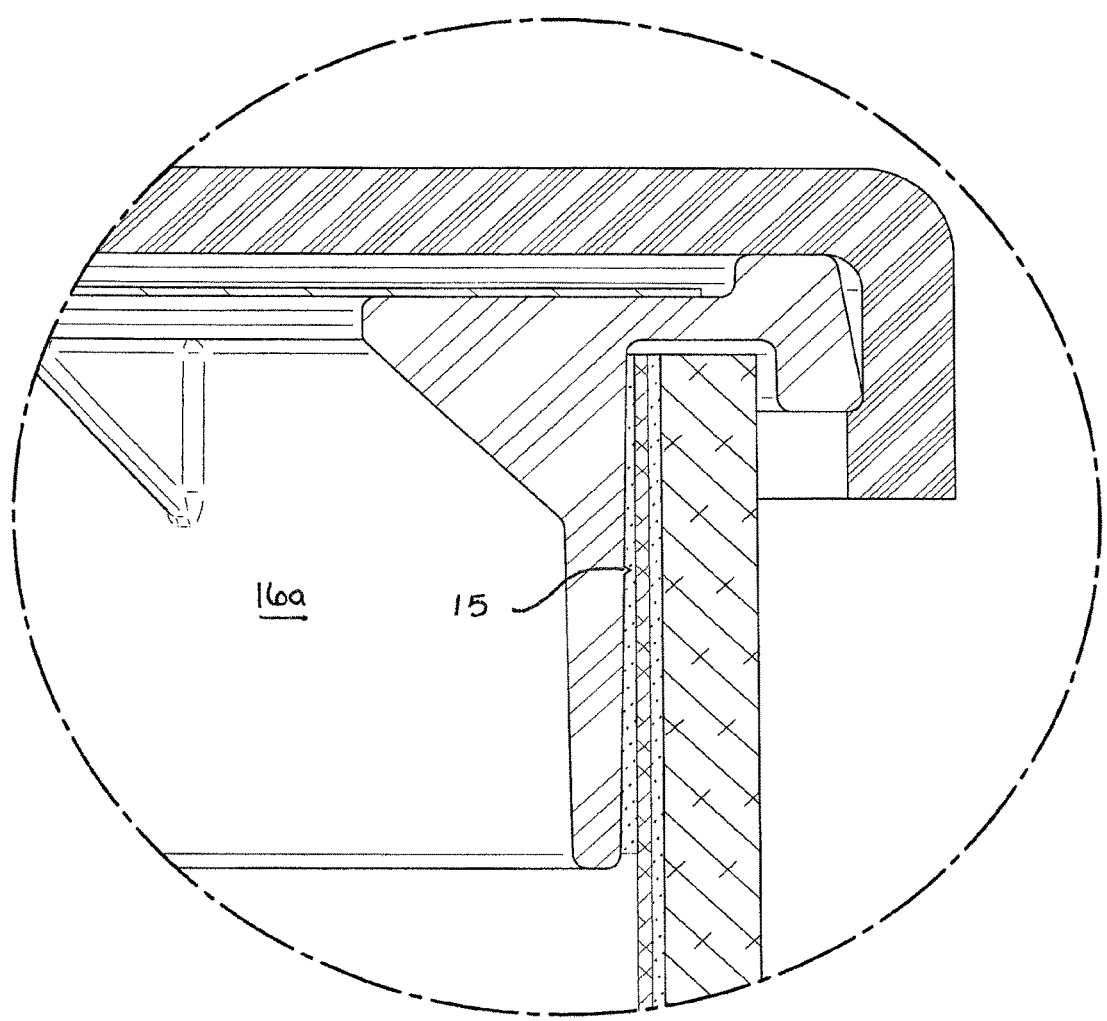
FIG. 3B is a detailed cross-sectional view of a top portion of the composite container 10 shown in FIG. 1B (with lid).

Referring to FIGS. 2A and 3B, the collar 16 includes a peripheral portion 52, an inner circumferential flange 54 and an outer flange 56. The inner flange 54 extends downwardly from the peripheral portion 52 and sized and shaped to snugly fit within the circumference of the interior wall 32 of the top open end 36 of the sidewall of the body 12. The distance between the inner flange 54 and the outer flange 56 is only slightly larger than the body 12. The inner circumferential flange 54, peripheral portion 52 and an outer flange 56 form a U-shape cross-section that is sized and configured for frictional engagement with the top open end 36 of the hollow body 12 on both its interior wall 32 and an exterior wall 34 when the collar 16 is coupled to the body 12 with its inner wall liner 14. The peripheral portions of the inner flange 54, peripheral portion 52, and outer flange 56 can be rounded, for safety purposes, and to further increase the aesthetic appearance of the resulting container. The peripheral portion 52 includes regions of weakened strength 58 located at least proximate to the exterior wall 60 of the inner circumferential flange 54 allowing the portion of the peripheral portion 52 and the outer flange 56 that extend beyond exterior wall 60 of the inner circumferential flange 54 to be removed.

Figure 4:
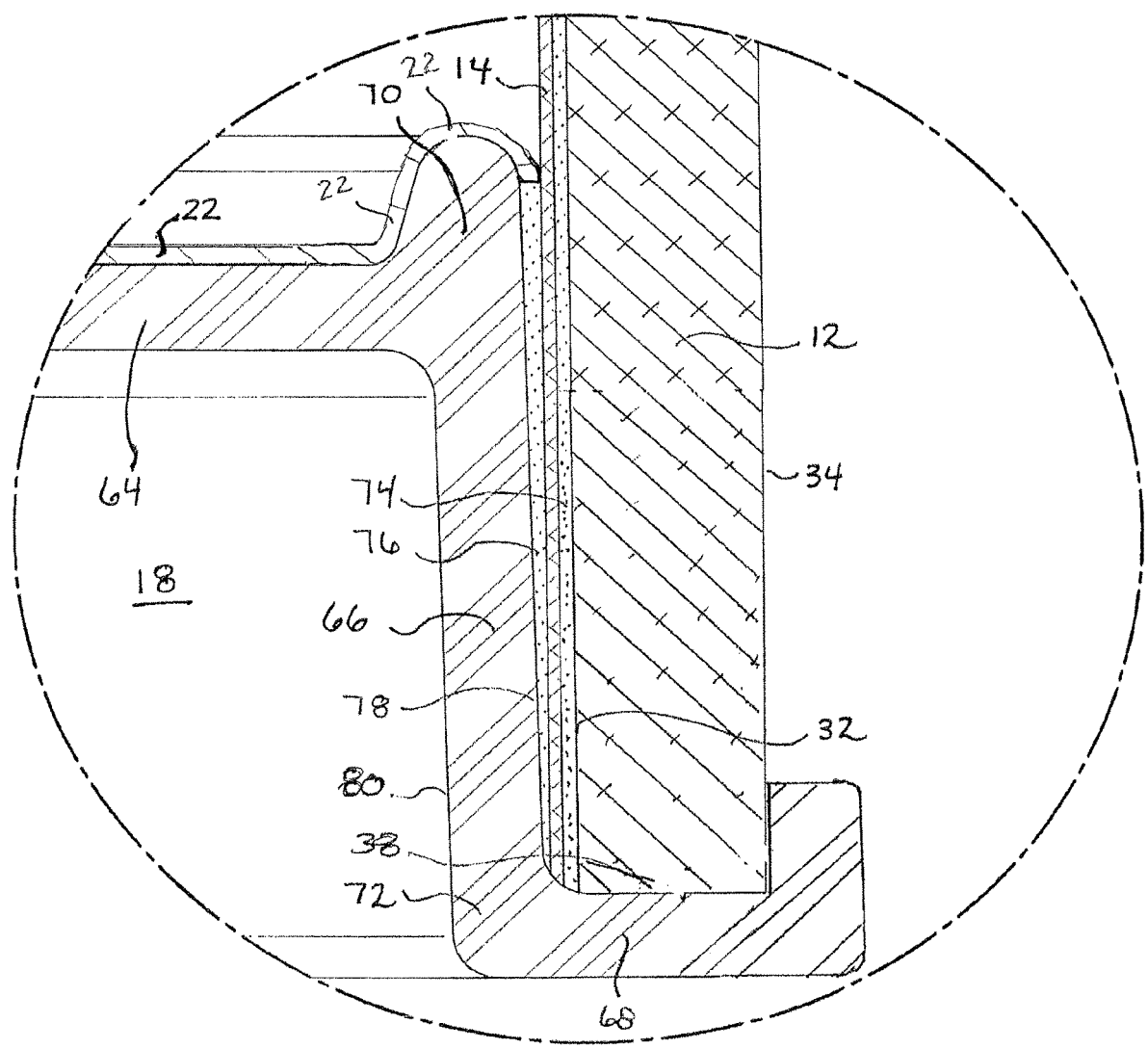
FIG. 4 is a detailed cross-sectional view of a bottom portion of the composite container shown in FIG. 1.

With reference to FIGS. 1A to 4, the base 18 is designed and sized to close off the bottom open end 38 of the body 12. The base 18 provides support to the lower portion of the body 12. Referring to FIG. 4, the base 18 comprises a top wall 64, sidewall 66 and a peripheral rim 68. The top wall 64 and sidewall 66 may be recessed inside the bottom open end 38 of the body 12. The top wall 64 extends between the sidewall 66. The top wall 64 can extend between the sidewall 66 at any position between the bottom and top of the sidewall 66. The top wall 64, as depicted in FIG. 4, extends between the circular sidewall 66 at an upper portion 70 of the sidewall 66. The peripheral rim 68 extends beyond the side wall 66 and is size and shaped to receive the bottom open end 38 of the hollow body 12.

The base 18 closes or seals off the bottom open end 38 of the hollow body 12 so that it can receive product. The sidewall 66 of the base 18 is received within the bottom open end 38 of the hollow body 12 such that the body 12 radially surrounds the sidewall 66 and the bottom open end 38 rest on the peripheral rim 68 extending beyond the sidewall 66. The sidewall 66 and the peripheral rim 68 forms a "U" shape cross-section to receive and frictional engage with the bottom open end 38 with its wall liner 14. The peripheral rim 68 protects the edge of the bottom open end 38 from damage in the present instance. The outer edges of the peripheral rim 68 can be rounded, for safety purposes, and to further increase the aesthetic appearance of the resulting product. In another embodiment, the peripheral rim 68 of the base 18 does not extend beyond the side wall 66 and the bottom open end 38 of the side wall 12 simply rest on the peripheral rim 68.

According to one embodiment, the base 18 includes a bottom liner 22 coupled to the top surface of the top wall 64. The bottom liner 22 may comprise a thin membrane having one or more layers to prevent the passage of light, moisture and/or gasses selected based on the product to be held in the container 10. The bottom liner 22 is generally the diameter of the hollow body or slightly larger and is permanently coupled with the liner 14 along the entire perimeter of the bottom liner 22. The bottom liner 22 is permanently coupled to the liner 14 using conventional adhesives or by ultrasonic coupling means. The bottom liner 22 permanently coupled with the liner 14 creates a hermetically sealed cavity to receive product. Unlike using a plastic bag within a container, the coupled bottom liner 22 and liner 14 conform to the full perimeter of the sidewall of the container thus preventing undesired air pocket between the liners and the sidewall, bunching, or folding over of the liner inside the container.

According to an embodiment, a top liner 24 may added to the top of the collar 16 to hermetically seal the top end of the container 10. Specifically, the top liner 24 may be hermetically sealed to the peripheral portion 52 of the collar 16 with an adhesive sealant such that the top liner 24 conforms radially and circumferentially with the peripheral portion 52 of the collar 16. The top liner 24 may comprise a thin membrane having one or more layers of paper, oxygen inhibiting material and thermoplastic material. The top liner 24 may be shaped to facilitate removal from the collar 16, i.e., may be shaped to include an integral pull-tab for removal from the collar 16. In some examples, the top liner 24 is configured for removal and reattachment to the collar 16 before and after the top liner 24 is removed.

According to an embodiment, the container 10 also includes a cover or lid 26. The lid 26 is designed or manufactured to be placed over the collar 16 for the purpose of closing the container 10. In one embodiment, the lid is joined to the collar 16 by a hinge (not shown) allowing the lid to be pivoted about the hinge onto the collar to open and close the container 10.

The shape of the collar 16 and the base 18 are circular in FIGS. 1 to 4. It is however to be understood that the collar and base shapes may be manufactured according to the shape and circumference of the hollow body of a particular desired container. Preferably, the collar 16 and the base 18 are formed of an injected molded plastic part or a plastic derivative. The collar 16 and the base 18 can be formed using conventional molding or fabrication processes and equipment.

A method of manufacturing the composite container 10 according to the invention is described. One or more strips of liner material are wrapped around a cooled shaping mandrel. Conventional liquid adhesive or thermo bonding can be used to couple the strips of material which will ultimately define the liner 14. If more than one layer of liner material is used, the layers are superimposed and coupled by conventional liquid adhesive or thermo bonding. A temporary adhesive 74 is applied to the liner 14 before wrapping paperboard a continuous strip of a paperboard material or the like over the liner 14 on the mandrel. The term "temporary adhesive" means any adhesive that will be sufficiently tacky to hold the liner 14 to body 12 during the container manufacturing operation. The paperboard is spirally wound around the mandrel on the opposite side of the liner 14 in a convolute shape around the mandrel. The temporary adhesive 74 provides temporary bonding of the liner 14 to the body 12 during the manufacturing operation. The temporary adhesive 74 needs only to last as long as it take to attach the collar 16 and the base 18 to the lined body (12, 14). The lined body (12, 14) is cut into desired lengths. A conventional liquid adhesive for coupling a liner and plastics is then applied to top and bottom portions of the interior surface of the liner 14. Preferably, the conventional liquid adhesive 76 is applied to the circumference of a top and bottom portions of the interior surface of the liner 14. Preferably, the surface on which is applied the conventional liquid adhesive 76 at the bottom portion corresponds to the outer surface of sidewall 66 of the base 18. Preferably, the surface on which is applied the conventional liquid adhesive 76 at the top portion corresponds to the surface of the exterior wall 60 of the inner circumferential flange 54 of the collar 16.

The base 18 and the collar 16 are affixed to the hollow body 12 as described below. The base 18 is affixed to the bottom open end 38 of the lined body (12, 14) by inserting the sidewall 66 of the base 18 within the bottom open end 38 of the lined body (12, 14). The sidewall 66 of the base 18 becomes adhesively bonded to bottom portions of the interior surface of the liner 14 on which had been applied a conventional liquid adhesive 76 therefore hermetically sealing the bottom end of the liner 14 with the base 18. The base 18 is also retained by the frictional engagement of the sidewall 66 with the interior wall 32 of the bottom open end 38 of the hollow body 12. The base 18 is not permanently coupled to the hollow body 12. A simple frictional disengagement of the base 18 now permanently coupled with liner 14 such as the pulling of the base 18 away from the body 12 would be sufficient to disengage the base with liner (18, 14) from the body 12. The collar 16 is then affixed to the top open end 36 of the lined body (12, 14) by inserting the inner circumferential flange 54 within the top open end 38 of the body 12. The exterior wall 60 of the inner circumferential flange 54 of the collar 16 becomes adhesively bonded to top portion of the interior surface of the liner 14.

The permanently coupled base 18, liner 14 and collar 16 frictionally engaged with the ends of the body 12 provide rigidity for the overall container.

Depending on the product that will be held within the container 10, a top liner 24 may optionally be added to the peripheral portion 52 of the collar 16 with an adhesive sealant such that the top liner 24 to hermetically seal the container 10. The top liner 24 would be added after filing the container with the product. A lid 26 may also be added to secure to the collar 16.

The disassembly of the composite container 10 into material groups that may require separate recycling (paper and plastics) may be readily be realized by the end consumer. If the container 10 included an optional lid 26 which was not hinged to the collar 16, the lid 26 can be removed from the collar 16. If the container included a top liner 24, the top liner 24 can be pulled upward or away from the collar 16.

The regions of weakened strength 58 on the peripheral portion 52 of the collar 16 are located and the portions of weakened strength that extend beyond the circumference of the interior wall 32 of the hollow body 12 are removed. The remaining portion of the collar 16 remains coupled to the liner 14 and the base 18 and is disengaged or separated from the hollow body 12 pushing the remaining portion of the collar 16 with its coupled liner 14 through the hollow body 12 or by pulling on the base 18 which will slide the coupled liner 14 and remaining portion of the collar 16 along the interior wall 32 of the hollow body 12 and through its bottom open end 38. With the plastic components (lid 26, top liner 24, collar 16, liner 14 and base 18) separated from the paperboard hollow body 12, the plastic components can be separately recycled from the paper components.

In one embodiment, the regions of weakened strength are located in the base 18 rather than the collar 16. Generally it is preferable to not have regions of weakened strength in the base 18 as this will more greatly affect the containers ability to withstand sudden shock especially when dealing with containers that will hold substantial weight. Having a base 18 with weakened strength may be more appropriate for containers that will be holding lighter contents.

In another embodiment, neither the base 18 nor the collar 16 include regions of weakened strength. If either the base 18 or the collar 16 is made of a thin material or malleable plastic or derivative, the end consumer can push the base 18 or the collar 16 made of a thin material or malleable plastic or derivative with sufficient strength so that the base 18 or the collar 16 made of a thin material or malleable plastic or derivative enters the hollow body 12 and the coupled base, liner and collar (18, 14, 16) can be separated from the body 12 by pulling the retaining frictionally engaged base 18 or collar 16 away from the body 12. Alternatively, for container wherein neither the base 18 nor the collar 16 include regions of weakened strength and which may be too thick to be separated manually, mechanical forced separation can be used to separate the coupled base, liner and collar (18, 14, 16) from the body 12.

In one embodiment, shown in FIGS. 1B, 2B, 2C, 3B, the container comprises a collar 16a instead of a collar 16. Collar 16a is substantially similar to collar 16 however the exterior wall 60 of the inner circumferential flange 54 includes a circumferential ridge (15 or 15a). Using ultrasonic coupling means the collar 16a can be coupled to the liner 14 at the circumferential ridge (15 or 15a) instead of using a conventional liquid adhesive 76. In one embodiment, ultrasonic coupling means and a conventional liquid adhesive are used to couple the collar 16a to the liner 14.

In one embodiment (not shown), the base 18 may include a circumferential lip like the circumferential ridge (15 or 15a) of collar 16a so that the base 18 may be coupled to the liner 14 using ultrasonic coupling means instead of or in addition to a conventional liquid adhesive 76.

Example 2

With reference to FIGS. 5A to 15, another embodiment of the composite container 100 is shown. The container 10 includes a hollow body 12, a liner 14, a collar 17, a base 19 and a bottom framing element 20. The container 100 may also include one or more of a bottom liner 22, a top liner 24 and lid 26.

As illustrated, the hollow body 12, has a single sidewall 30 in the shape of a cylinder with an interior wall 32, an exterior wall 34, a top open end 36 and a bottom open end 38. The top open end 36 and a bottom open end 38 may have a substantially similar cross section as the sidewall 30. The hollow body 12 is typically formed by convoluting or spiraling plies of paperboard. The hollow body 12 can be any size. While the hollow body 12 shown is a tubular shape, the body may have any shape of cross-section such as circular, rectangular, square, triangular, or oval. The bottom open end 38 of the hollow body 12 includes cut-outs or recesses 40. While the recesses 40 shown are square in shape, the recesses may other shapes such as rectangular, triangular, circular, oval, half circle, half oval or the like. Cut-outs or recesses 40 may be especially desirable if the sidewall width of the body 12 is large which may be the case for larger containers or containers that will hold heavy content. According to one embodiment, the body 12 does not include cut-outs or recesses 40.

The wall liner 14 may comprise one or more protective layers to protect the interior wall 32 of the body 12 and prevent the passage of light, moisture and/or gasses into and out of the container 10, as in known in the art and selected based on the product to be received within the container 10. The wall liner 14 includes a top edge 42 and bottom edge 44. The wall liner 14 extends peripherally about the interior wall 32 of the body 12 and fully conforms to the shape and dimensions of the interior wall 32.

Figure 6A:
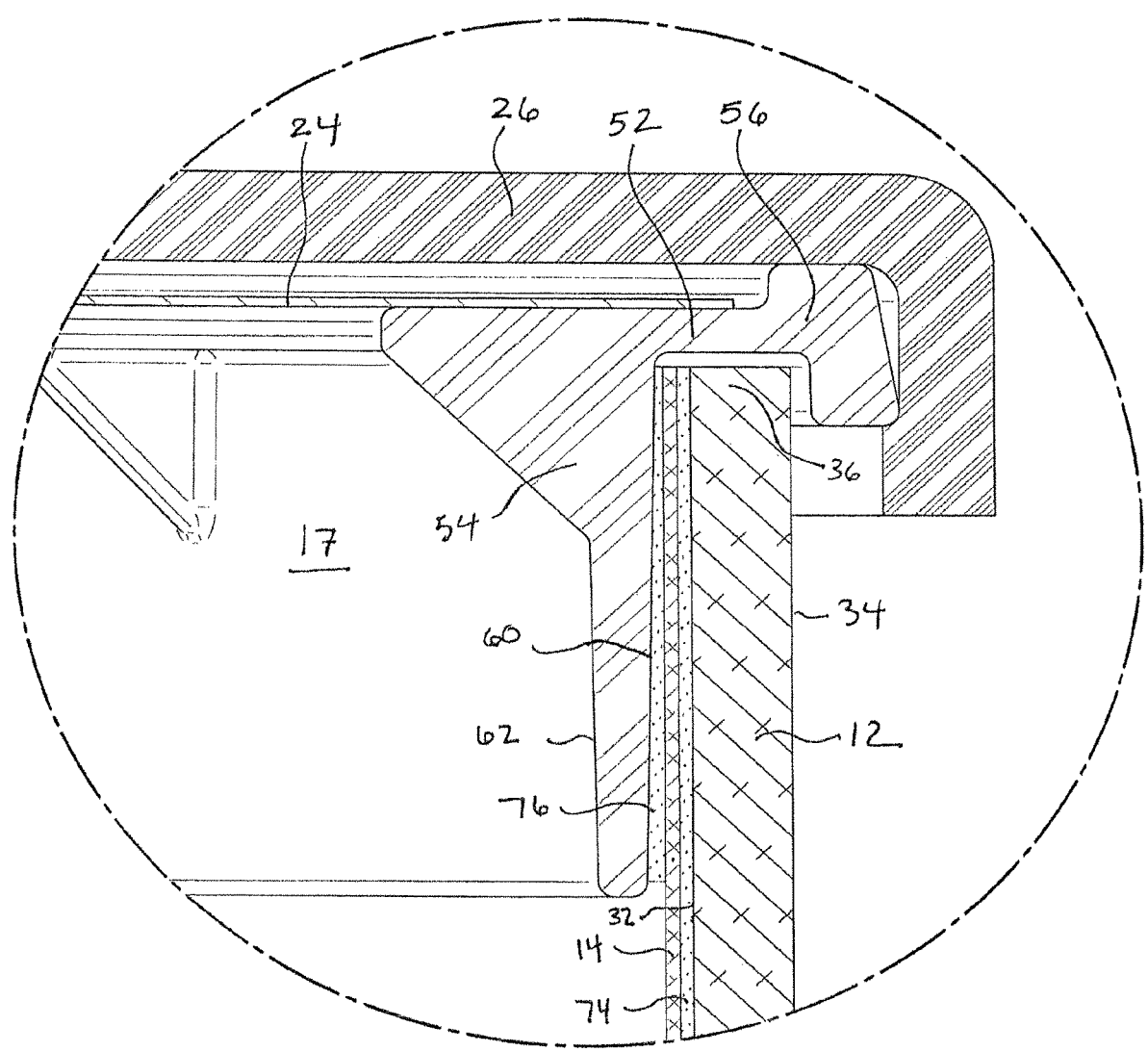
FIG. 6A is a detailed cross-sectional view of a top portion of the composite container according to the embodiment of the invention shown in FIGS. 5A and 5B.

The collar 17 is sized and shaped for snugly fitting over the top open end 36 of the body 12 and the liner 14. The collar 17 provides structural support to the body 12. Referring to FIG. 6, the collar 17 includes a peripheral portion 52, an inner circumferential flange 54 and an outer flange 56. The inner flange 54 extends downwardly from the peripheral portion 52 and sized and shaped snugly about the circumference of the interior wall 32 of the top open end 36 of the body 12. The distance between the inner flange 54 and the outer flange 56 is only slightly larger than the body 12. The inner circumferential flange 54, peripheral portion 52 and an outer flange 56 form a U-shape cross-section that clamp the top open end 36 of the hollow body 12 on both its interior wall 32 and an exterior wall 34 when the collar 17 is connected to the hollow body coupled with the wall liner 14. The peripheral portions of the inner flange 54, peripheral portion 52, and outer flange 56 can be rounded, for safety purposes, and to further increase the aesthetic appearance of the resulting container.

Figure 5C:
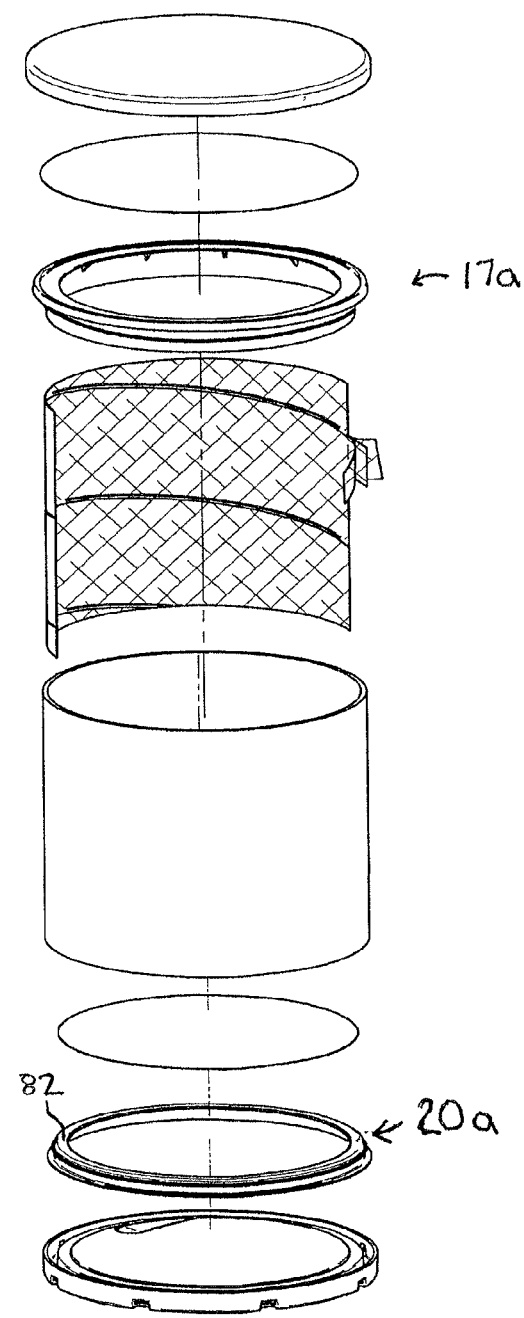
FIG. 5C is an exploded view of a composite container according to an embodiment of the invention.
Figure 5D:
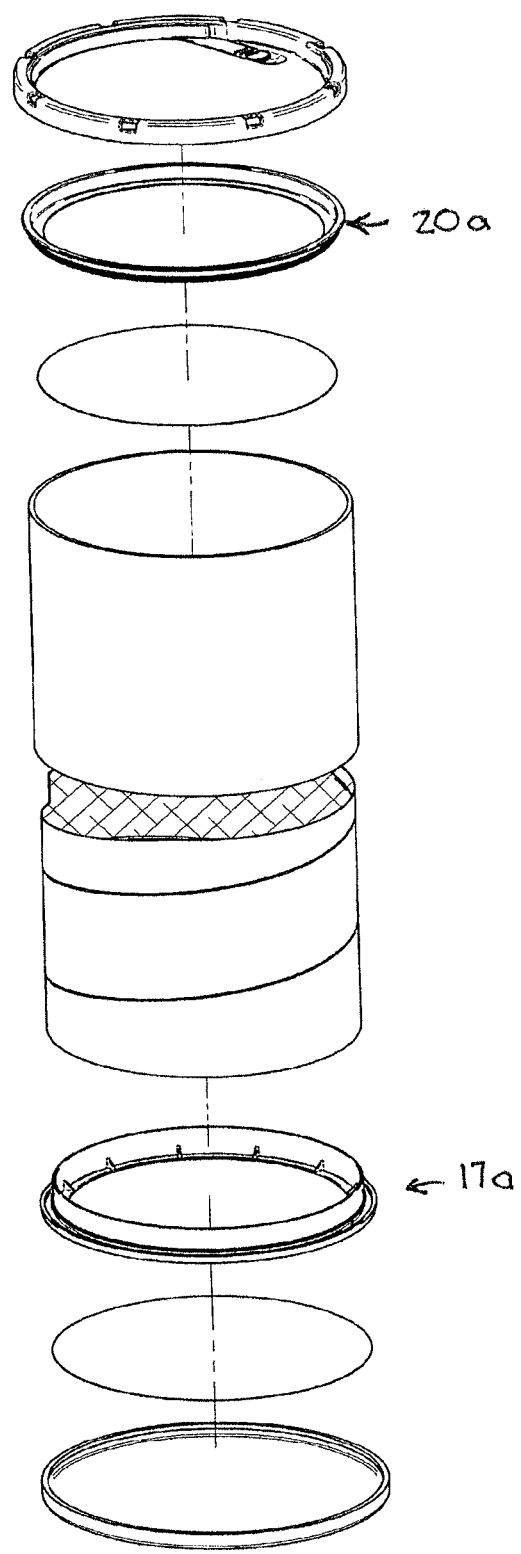
FIG. 5D is an exploded view of a composite container according to an embodiment of the invention shown in FIG. 5C in upside down view.

In one embodiment, shown in FIGS. 5C, 5D and 6B, the container comprises a collar 17a instead of a collar 17. Collar 17a is substantially similar to collar 17 however the exterior wall 60 of the inner circumferential flange 54 includes a circumferential ridge 15. Using ultrasonic coupling means the collar 17a can be coupled to the liner 14 at the circumferential ridge 15 instead of using a conventional liquid adhesive 76. In one embodiment, ultrasonic coupling means and a conventional liquid adhesive are used to couple the collar 17a to the liner 14.

A top liner 24 can be added to hermetically seal the top end of the container 10. Specifically, the top liner 24 may be hermetically sealed to the peripheral portion 52 of the collar (17 or 17a) with an adhesive sealant such that the top liner 24 conforms radially and circumferentially with the peripheral portion 52 of the collar (17 or 17a). The top liner 24 may comprise a thin membrane having one or more layers of paper, oxygen inhibiting material and thermoplastic material. If the top liner 24 is made of multiple layers, the layers will preferably be made of materials that can be recycled together. The top liner 24 may be shaped to facilitate removal from the collar (17 or 17a), i.e., may be shaped to include an integral pull-tab (not shown) for removal from the collar (17 or 17a). In some examples, the top liner 24 is configured for removal and reattachment to the collar 17 before and after the top liner 24 is removed.

The container 100 may also include a cover or lid 26. The lid 26 is designed or manufactured to be placed over the collar 17 for the purpose of closing off the top of the container 100. In one embodiment, the lid 26 is joined to the collar (17 or 17a) by a hinge (not shown) allowing the lid 26 to be pivoted about the hinge onto the collar (17 or 17a) to open and close the container 100.

Figure 7A:
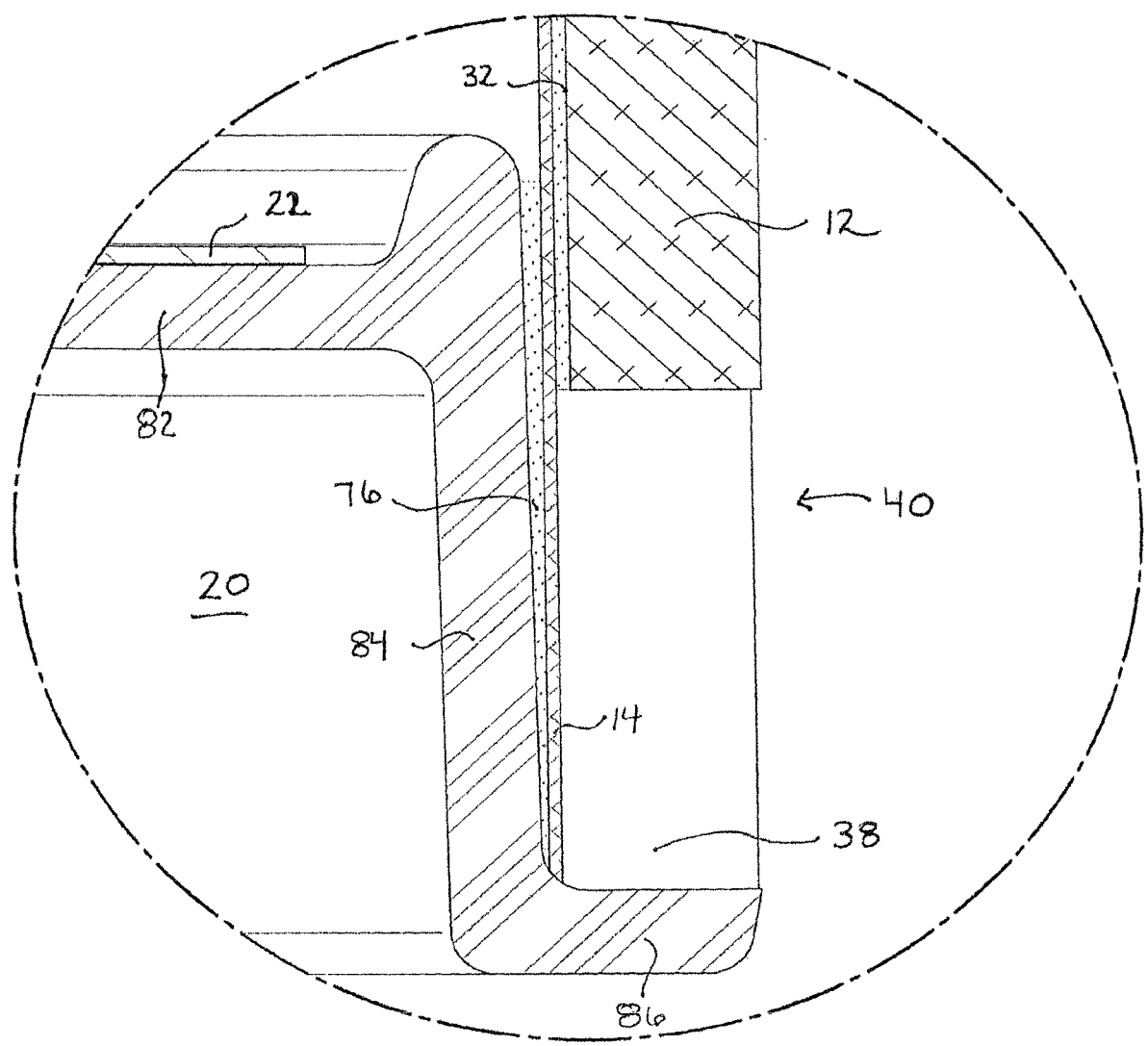
FIG. 7A is a detailed cross-sectional view of a bottom portion of the composite container according to the embodiment of the invention shown in FIGS. 5A and 5B (without base).
Figure 7B:
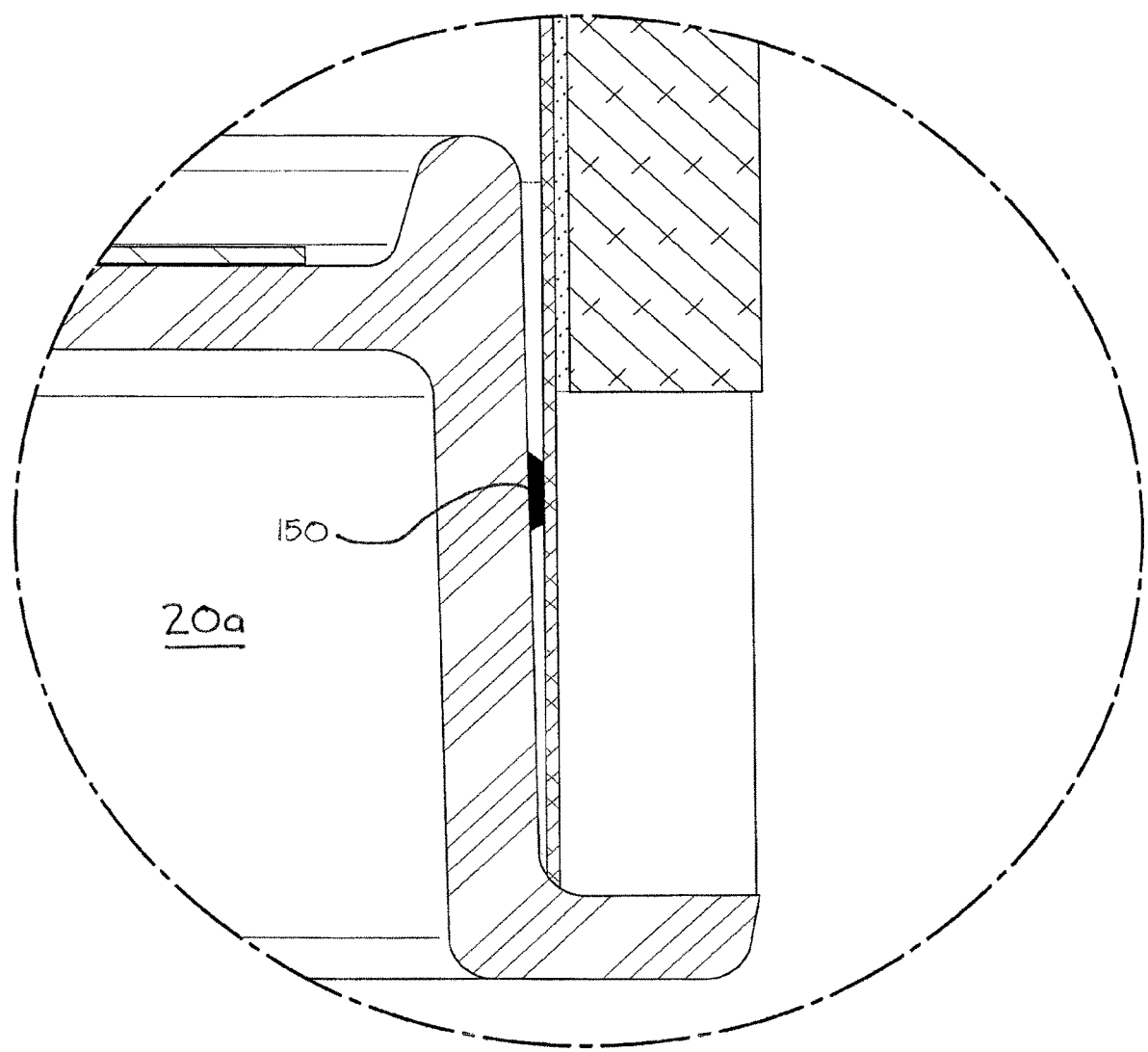
FIG. 7B is a detailed cross-sectional view of a bottom portion of the composite container according to the embodiment of the invention shown in FIGS. 5C and 5D (without base).
Figure 8B:
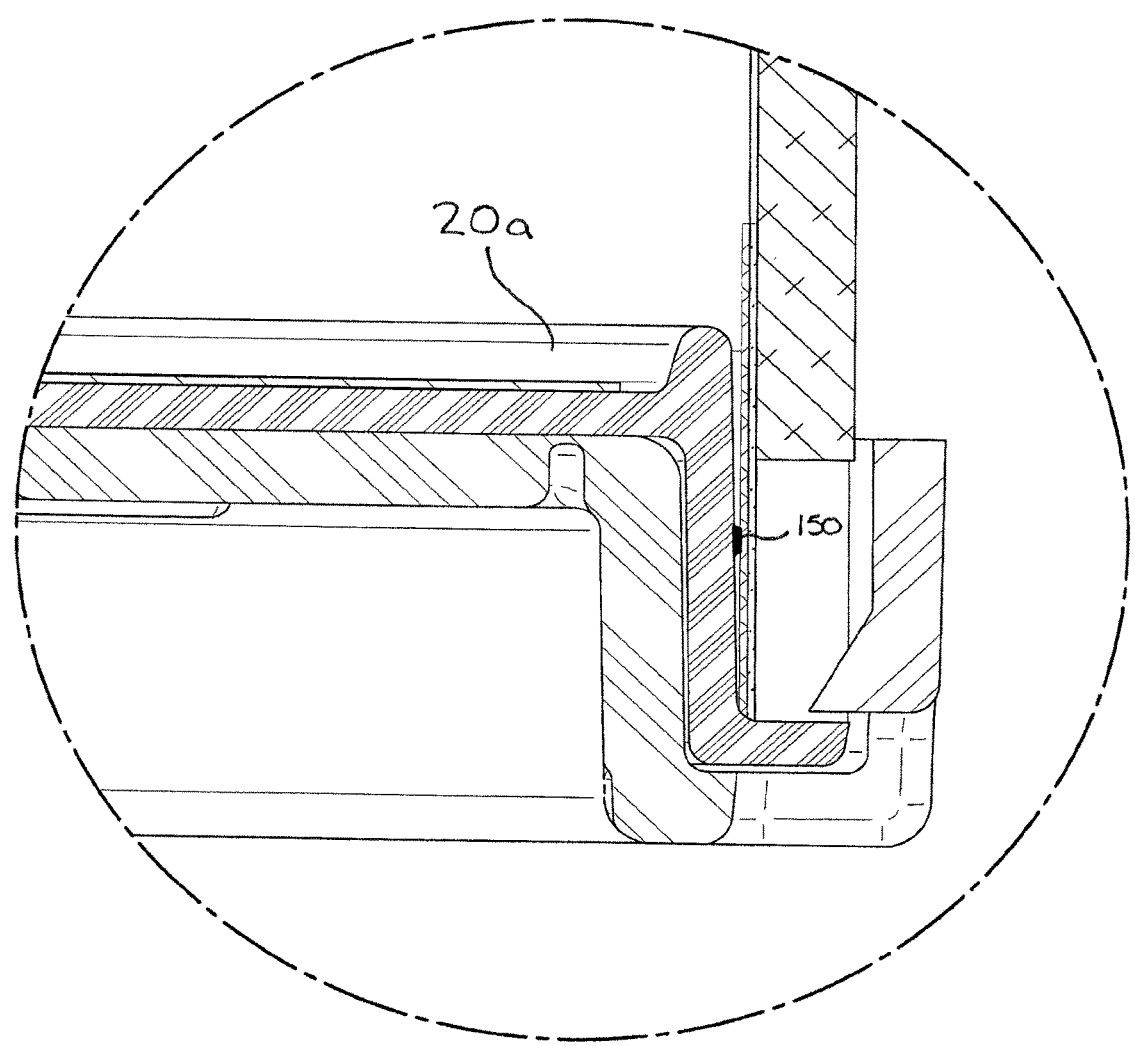
FIG. 8B is a detailed cross-sectional view of a bottom portion of the composite container according to the embodiment of the invention shown in FIGS. 5C and 5D.
Figure 11:
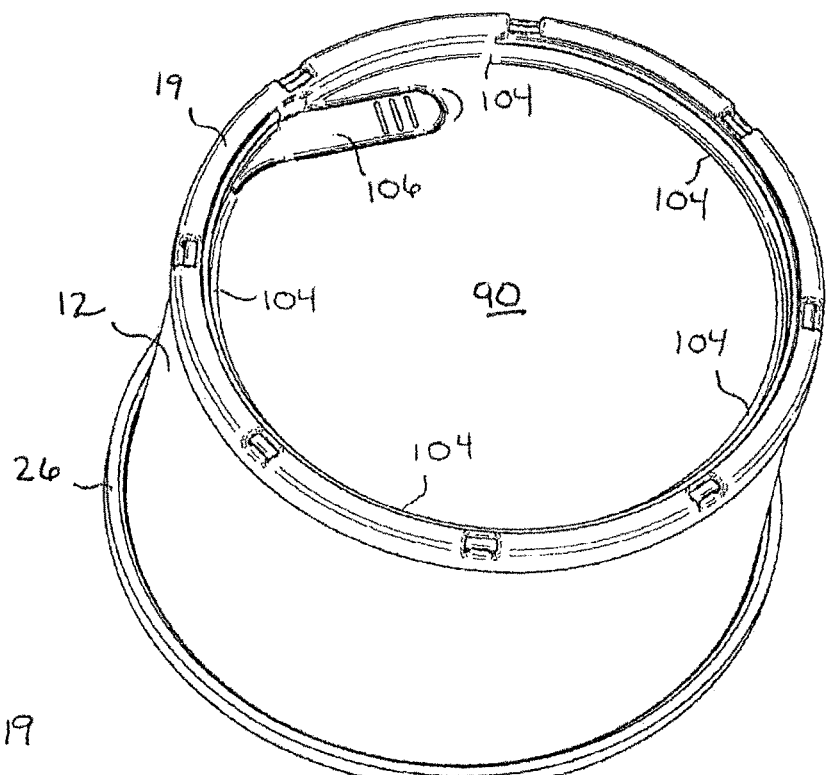
FIG. 11 is a perspective view of the composite container in an upside down orientation according to embodiments of the invention shown in FIGS. 5A to 5D.
Figure 12:
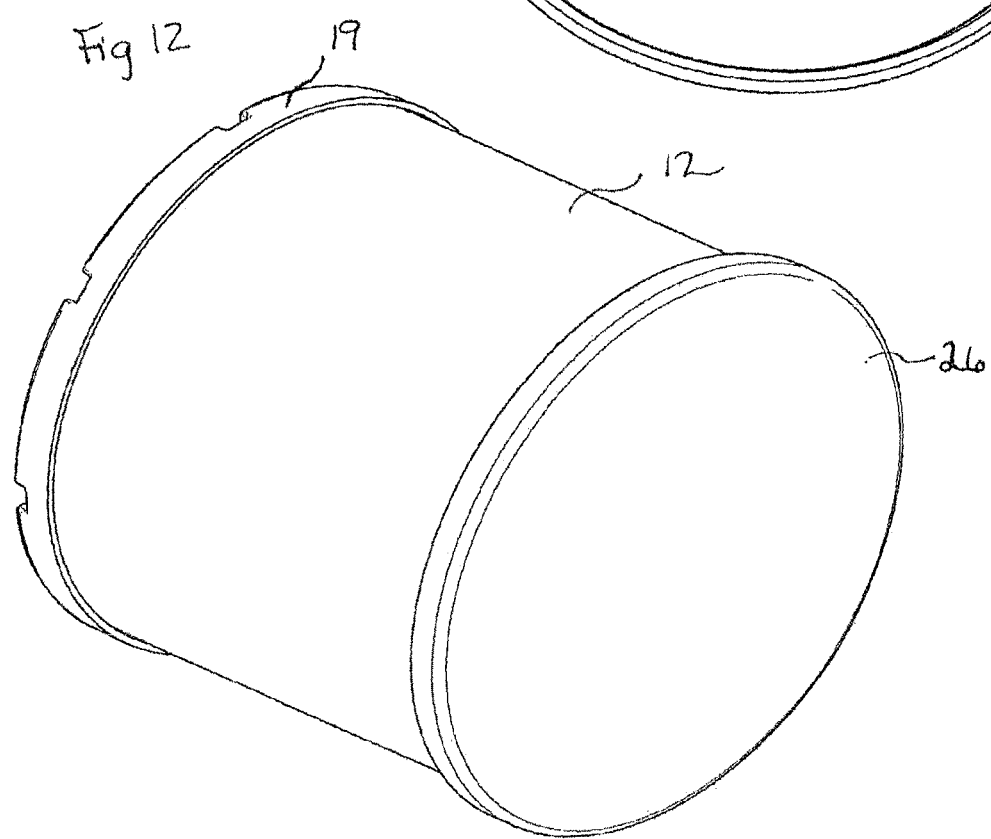
FIG. 12 is a perspective view of the composite container on its side according to embodiments of the invention shown in FIGS. 5A to 5D.
Figure 13:
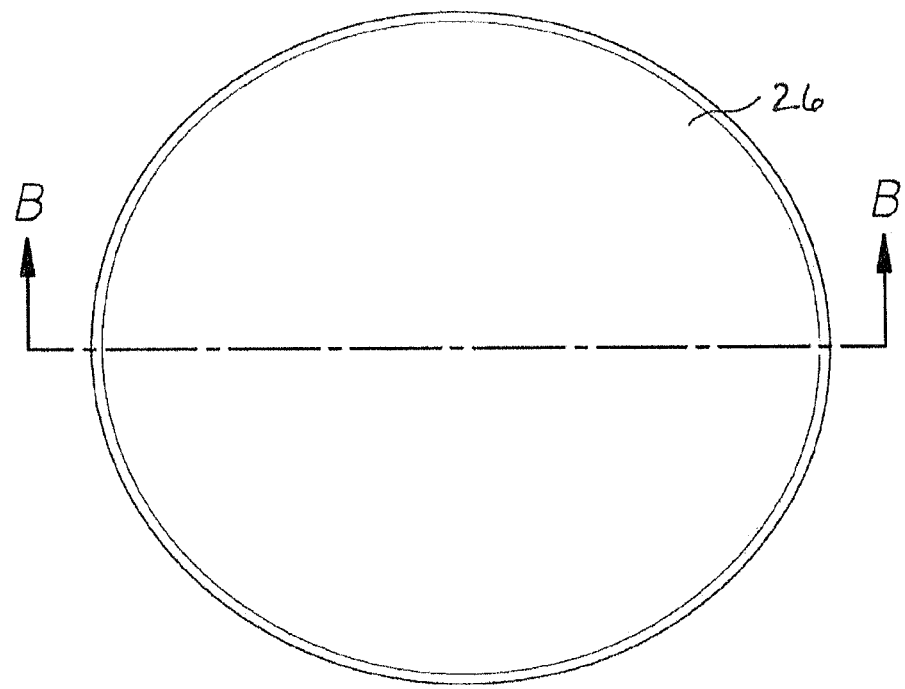
FIG. 13 is a top view of the composite container according to embodiments of the invention shown in FIGS. 5A to 5D.
Figure 14:
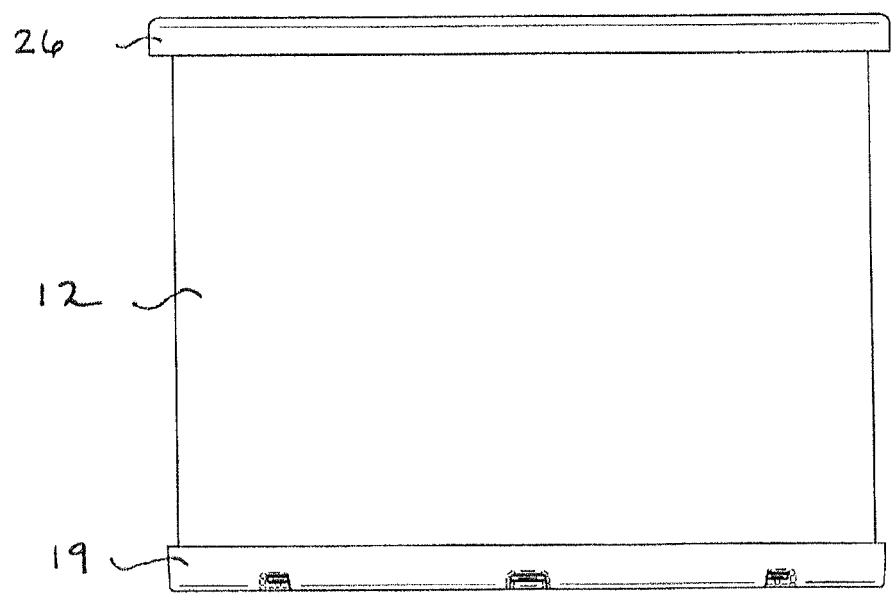
FIG. 14 is a side view of the composite container according to embodiments of the invention shown in FIGS. 5A to 5D.
Figure 15:
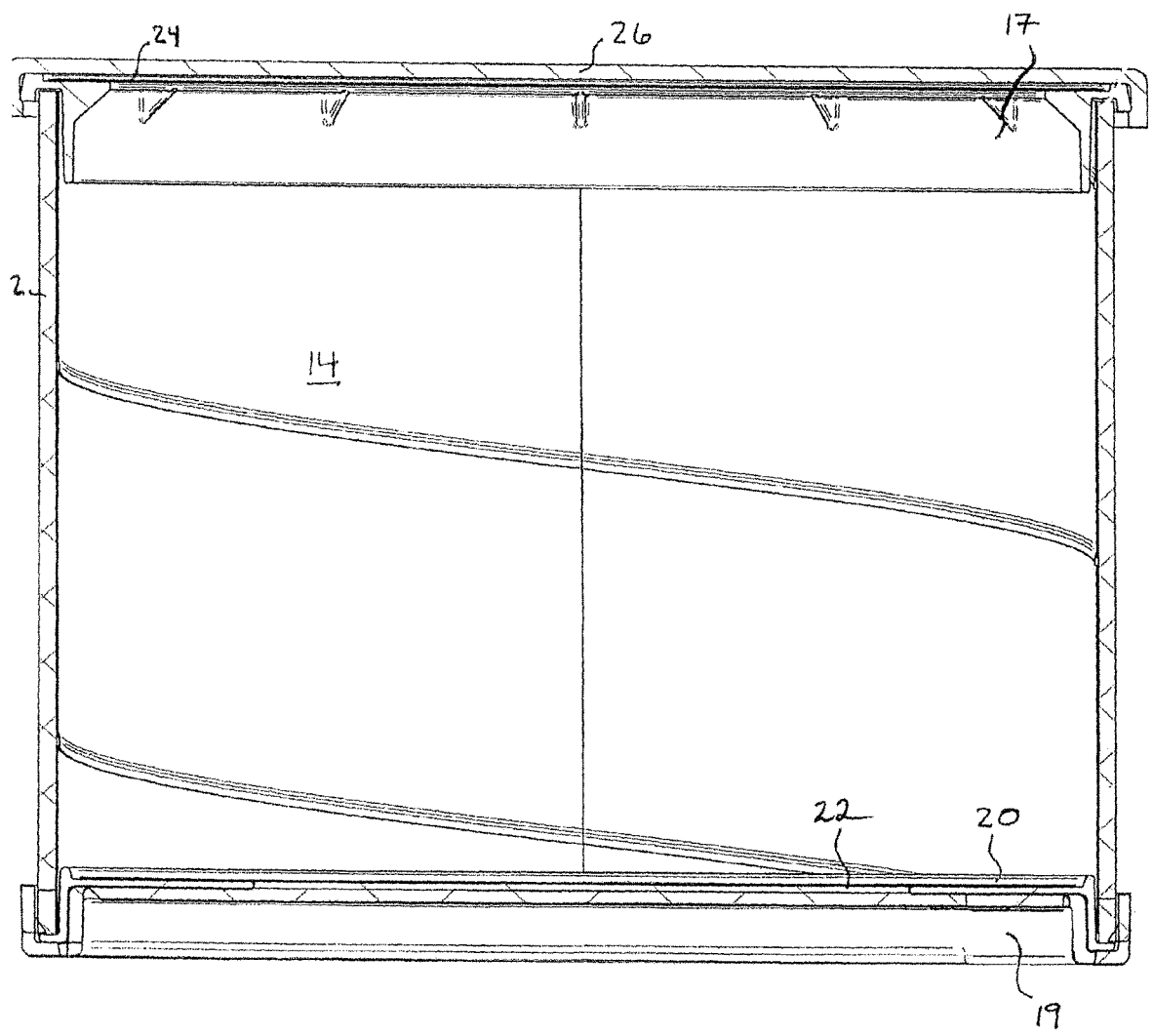
FIG. 15 is a cross-sectional view of the composite container according to the embodiment of the invention shown in FIGS. 5A and 5B.

The framing element 20 is designed and sized to close off the bottom open end 38 of the body 12. The framing element 20 is preferably made of a semi-rigid plastic material which can be easily bent or twisted. Referring to FIGS. 7A and 7B, the framing element 20 comprises a top wall 82, sidewall 84 and a peripheral rim 86. The top wall 82 and sidewall 84 are designed and sized to be recessed inside the bottom open end 38 of the body 12. The top wall 82 extends between the sidewall 66 near the top of the sidewall 66. The top wall 82 may either be a solid piece or include a recess 88 that corresponds to a raised area on the upper surface of the top wall 90 of the base 19. Referring to FIG. 5C and framing element 20a, the top wall 82 can be a very thin. The peripheral rim 86 extends outwardly from the bottom of the sidewall 66 and its width corresponds more or less to the width of the bottom open end 38 of the hollow body 12. The framing element 20 may comprise a bottom liner 22 adhesive coupled to the top surface of the top wall 82 or the bottom surface of the top wall 82 (not shown) to hermetically seal the bottom of the container 10. The bottom liner 22 may comprise a thin membrane having one or more layers to prevent the passage of light, moisture and/or gasses selected based on the product to be held in the container 100. The bottom liner 22 is generally the diameter of the hollow body or slightly larger and is permanently coupled with the liner 14 proximate to the framing element (20, 20a). The bottom liner 22 is permanently coupled to the liner 14 using conventional adhesives or by ultrasonic coupling means. The bottom liner 22 permanently coupled with the liner 14 creates a hermetically sealed cavity to receive product. Unlike using a plastic bag within a container, the coupled bottom liner 22 and liner 14 conform to the full perimeter of the sidewall of the container thus preventing undesired air pocket between the liners and the sidewall, bunching, or folding over of the liner inside the container.

In one embodiment, the framing element 20 may also comprise a region of weakened strength (not shown) between the sidewall 84 and the peripheral rim 86 so that the peripheral rim 86 may be separated from and disengaged from the sidewall 84.

In one embodiment, shown in FIGS. 5D and 7B, 8B, 10B, 10C, the container comprises a framing element 20a instead of a instead of a framing element 20. Framing element 20a is substantially similar to framing element 20 however the exterior wall of the sidewall 84 of the framing element 20 includes a circumferential ridge 150. Using ultrasonic coupling means the framing element 20a can be coupled to the liner 14 at the circumferential ridge 150 instead of using a conventional liquid adhesive 76. In one embodiment, ultrasonic coupling means and a conventional liquid adhesive are used to couple the framing element 20a to the liner 14.

The base 19 is designed and sized to interact with the framing element 20 and the bottom open end 38 of the body 12 to close off the bottom of the container 100. The base 19 provides additional support to the bottom portion of the body 12. Referring to FIG. 8, the base 19 comprises a top wall 90, sidewall 92 and a peripheral lip 94. The top wall 90 extends between the sidewall 92 near the top of the sidewall 92. The top wall 90 may comprise a raise area which corresponds to a recess 88 of the top wall 82 of the framing element 20. The top wall 90 and sidewall 92 are designed to fit within the sidewall 84 and top wall 82 of the framing element (20, 20a). The peripheral lip 94 extends beyond the sidewall 92 and is size and shaped to peripheral rim 86 of the framing element (20, 20a) coupled to the bottom open end 38 of the hollow body 12. The peripheral lip 94 generally has an "L-shaped" cross-section comprising a peripheral flange 96 and a perpendicular flange 98 extending from the distal end of the peripheral flange 96. The inner wall of the perpendicular flange 98 includes a number of projections 100 designed to fit with the recesses 40 of bottom open end 38 of the hollow body 12 and to damp the peripheral rim 86 of the framing element 20 with the base 19, when is use. Referring to FIG. 9, the base 19 includes regions of weakened strength 104 in the top wall 90 and sidewall 92. The bottom surface of the top wall 90 of the base 19 includes a pull-tab 106 to enable a consumer to disengage the base 19 from the framing element (20, 20a) and hollow body 12.

The shape of the collar (17, 17a), framing element (20, 20a) and the base 19 are circular in FIGS. 5A to 15. It is however to be understood that the collar (17, 17a), framing element (20, 20a) and base 19 shapes may be manufactured according to the shape and circumference of the hollow body of a particular desired container. Preferably, the collar (17, 17a), the framing element (20, 20a) and the base 19 are formed of an injected molded plastic part or a plastic derivative. The collar (17, 17a), the framing element (20, 20a) and the base 19 can be formed using conventional molding or fabrication processes and equipment.

A method of manufacturing the composite container 100 according to this second exemplary embodiment of the invention is described. One or more strips of liner material are wrapped around a cooled shaping mandrel. Conventional liquid adhesive or thermo bonding can be used to couple the strips of material which will ultimately define the liner 14. If more than one layer of liner material is used, the layers are superimposed and coupled by conventional liquid adhesive or thermo bonding. A temporary adhesive 74 is applied to the strips of paperboard or the like before wrapping paperboard over the liner 14 on the mandrel. The paperboard is spirally wound around the mandrel on the opposite side of the liner 14 in a convolute shape around the mandrel. The temporary adhesive 74 provides temporary bonding of the liner 14 to the body 12 during the manufacturing operation. The temporary adhesive 74 needs only to last as long as it take to attach the collar 17 and the framing element 20 to the lined body (12, 14). The lined body (12, 14) is cut into desired lengths. A conventional liquid adhesive 76 for coupling a liner and plastics is then applied to top and bottom portions of the interior surface of the liner 14. Preferably, the conventional liquid adhesive 76 is applied along the circumference of a top and bottom portions of the interior surface of the liner 14. Preferably, the surface on which is applied the conventional liquid adhesive 76 at the bottom portion corresponds to the outer surface of sidewall 84 of the framing element 20. Preferably, the surface on which is applied the conventional liquid adhesive 76 at the top portion corresponds to the surface of the exterior wall 60 of the inner circumferential flange 54 of the collar 17.

A base liner 22 is coupled to the upper surface of the top wall 82 of the framing element 20 with an adhesive sealant. In one embodiment, the base liner 22 is coupled to the bottom surface of the top wall 82a of the framing element 20a.

The lined framing element (20, 22) is mounted to the bottom open end 38 of the lined body (12, 14). The peripheral rim 86 of the framing element 20 rests on the edge of the bottom open end 38 of the lined body (12, 14) and the sidewall 84 of the lined framing element (20, 22) is circumferentially surrounded by the interior wall 32 of the lined body (12, 14) and retained by to the bottom open end 38 of the lined body (12, 14) by frictional engagement of the sidewall 84 and the interior wall 32. The bottom portions of the interior surface of liner 14 which was coated with conventional liquid adhesive 76 becomes adhesively bonded to the sidewall 84 hermetically sealing the open end 38 of the hollow body 12. The framing element 20 is not permanently coupled to the hollow body 12.

The base 19 is affixed to the framing element 20. The top wall 90 and sidewall 92 fit within the sidewall 84 and top wall 82 of the framing element 20. The peripheral rim 86 of the framing element 20 fits within the peripheral lip 94 of the base 19. The base 19 is retained by the locking interaction of the projections 100 of the peripheral lip 94 of the base 19 with the peripheral rim 86 of the framing element 20 and by frictional engagement of sidewalls 84 and 92 of the base 19 and framing element (20, 20a).

The collar 17 is affixed to the top open end 36 of the lined body (12, 14). The exterior wall 60 of the inner circumferential flange 54 of the collar 17 becomes adhesively bonded to top portion of the interior surface of the liner 14 which was coated with conventional liquid adhesive 76. Alternatively, if collar 17a is used instead of collar 17, the exterior wall 60 of the inner circumferential flange 54 is ultrasonically coupled with the liner 14 via ridge (15, 15a). A top liner 24 may be coupled to a portion of the collar (17 or 17a) with an adhesive sealant such that the top liner 24 hermetically seals the top of the container 100. The top liner 24 would be added after filing the container with the product. A lid 26 may also be secured to the collar 17.

The disassembly of the composite container 100 into material groups that may require separate recycling (paper and plastics) may be readily be realized by the consumer. If the container 10 included a lid 26, the lid 26 can be removed from the collar 16. If the container included a top liner 24, the top liner 24 can be pulled upward or away from the collar 16 to remove the top liner 24 from the collar 16. The consumer locates the pull-tab 106 on the bottom surface of the top wall 90 of the base 19 and pulls the pull-tab 106 upwards or away from the base 19. The pull-tab 106 engages the regions of weakened strength 104 within the top wall 90 and sidewall 92 along the circumference of the base 19. By continuing to pull the pull-tab 106 upwards or away from the base 19 along the entire circumference of the base 19, the top wall 90 and at least a portion of the sidewall 92 become separated from the peripheral lip 94 allowing the base 19 to be separated from the framing element (20 or 20a).

Once the base 19 has been separated from the framing element (20 or 20a), the consumer pushes the top wall 82 of the framing element (20 or 20a) inside the body 12 towards the collar (17 or 17a) so that the peripheral rim 86 is disengaged from the edge of the bottom open end 38 of the hollow body 12 and enters the hollow body 12. In an alternative embodiment, the framing element (20 or 20a) includes a region of weakened strength (not shown) between the sidewall 84 and the peripheral rim 68 so that the peripheral rim 68 may be separated from and disengaged from the sidewall 84. Once the peripheral rim 68 is separated from the sidewall 84, the remaining portion of the framing element is free to move within the hollow body 12. This alternative embodiment would generally be included when the framing element is made of a harder or thicker plastic as the peripheral rim 86 may not easily be pushed into hollow body 12.

Once the framing element 20 is disengaged from the edge of the bottom open end 38 of the hollow body 12, the consumer remove the coupled collar (17 or 17a), liner 14 and framing element 20 which are coupled together by pulling the collar (17 or 17a) away from the hollow body 12. With the plastic components (lid 26, top liner 24, collar (17, 17a), liner 14, framing element (20, 20a) and base 19) separated from the paperboard hollow body 12, the plastic components can be separately recycled from the paper components.

Example 3

Figure 16:
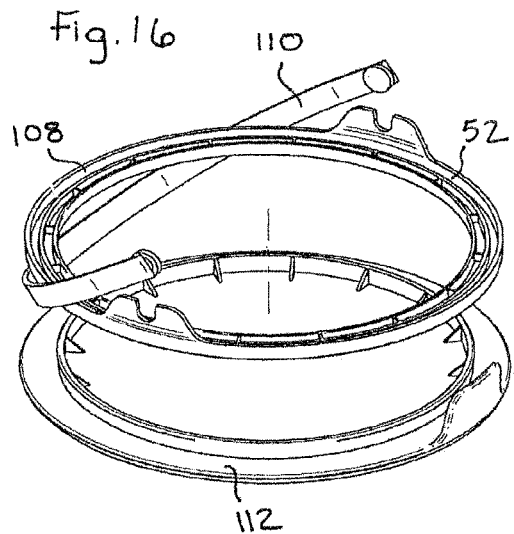
FIG. 16 are perspective upside down views of a collar, handle and cover according to an embodiment of the invention.
Figure 17:
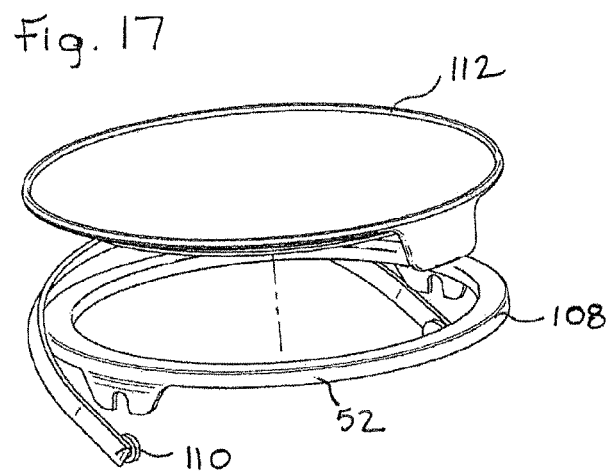
FIG. 17 are perspective views of the collar, handle and cover of FIG. 16.

With reference to FIGS. 16 and 17, an alternative collar 108, an alternative cover 112 and an optional handle 110 are shown. The alternative collar 108 and alternative cover 112 can be used with containers 10 and 100. The collar 108, cover 112 and optional handle 110, can be used with the container described in examples 1 and 2 and would replace the collars (16, 16a, 17 or 17a) and lid 26. The collar 108 differs from collar (16, 16a, 17 or 17a) in that collar 108 includes a locking groove to receive and couple with the ends of a handle 110.

The lid 112 is designed to fit over the collar 108 for the purpose of closing the container 10/100. The bottom side of the lid 112 comprises a circumferential flange that corresponds to the inner circumference of the peripheral portion 52 of the collar 108. When the lid 112 is affixed to collar 108, the circumferential flange of the lid is in frictional relationship with the inner circumference of the peripheral portion 52 of the collar 108. The lid may comprise tabs to facilitate the removal of the lid 112.

Figure 18:
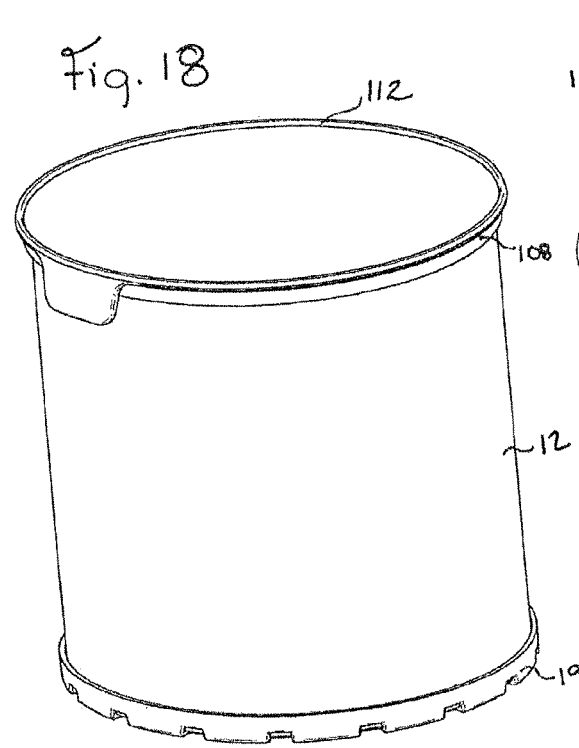
FIG. 18 is a perspective view of a composite container (without handle) according to an embodiment of the invention.

FIG. 18 depicts an embodiment of the composite container 100 with collar 108 and lid 112.

Figure 19:
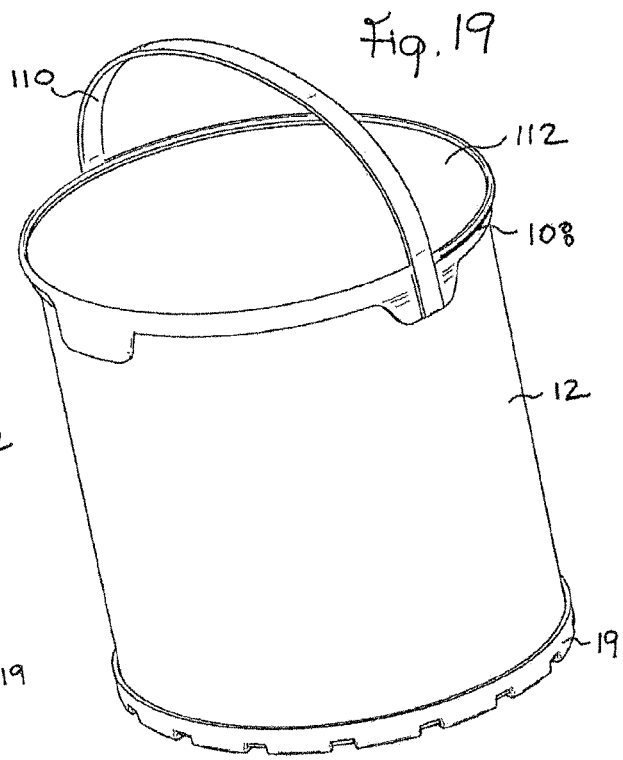
FIG. 19 is a perspective view of a composite container (with handle} according to an embodiment of the invention.

FIG. 19 depicts an embodiment of the composite container 100 with collar 108, lid 112 and handle 110.

Example 4

With reference to FIGS. 20A to 22, another embodiment of the composite container 200 is shown. The container 200 includes a hollow body 12, a liner 14, a collar 17a, a base 19, a bottom framing element 20, a bottom liner 22, and a lid 26a. The container includes many of the same components and method of construction and of dissembling as the containers described in Example 2. The variants in container 200 are described below.

The collar 17a is sized and shaped for snugly fitting over the top open end 36 of the body 12 and the liner 14. The collar 17a provides structural support to the body 12. The collar 17a includes a peripheral portion 52, an inner circumferential flange 54 and an outer flange 56. The inner flange 54 extends downwardly from the peripheral portion 52 and sized and shaped snugly about the circumference of the interior wall 32 of the top open end 36 of the body 12. The distance between the inner flange 54 and the outer flange 56 is only slightly larger than the body 12. The inner circumferential flange 54, peripheral portion 52 and an outer flange 56 form a U-shape cross-section that clamp the top open end 36 of the hollow body 12 on both its interior wall 32 and an exterior wall 34 when the collar 17a is connected to the hollow body coupled with the wall liner 14. The peripheral portions of the inner flange 54, peripheral portion 52, and outer flange 56 can be rounded, for safety purposes, and to further increase the aesthetic appearance of the resulting container. The peripheral portion 52 includes inwardly radially extending lip 53 and a center hole 55.

The collar 17a is coupled to the body and liner 14 in the same manners as described in Examples 1 and 2.

The lid 26a is designed to fit within the peripheral portion 52 of the collar 17a to over the center hole 55 of the collar 17a and close off the top of the container 100. The lid 26a is provided adjacent the one portion of its periphery with an opening or hole (hidden by pull-tab 77) which serves as both a dispensing opening and an air vent.

The opening is covered by a pull-tab 77 which is adhered by any suitable means such as heat sealing to the lid 26a. The pull-tab is composed of any suitable plastic material. After the pull-tab has been fastened to the lid over the opening or hole to seal the top of the container until such time as a pull tab is pulled away from the lid 26a to expose the opening. The lid 26a is also provided with one or raised ridges which serve to retain the pull-tab.

Example 5

With reference to FIG. 23, an alternative collar 114 is shown.

The collar 114 is sized and shaped for snugly fitting within the top open end 36 of the body 12 coupled with liner 14. The collar 114 provides structural support to the body 12. The collar 114 includes a peripheral portion 152, a circumferential flange 154 which extends downwardly from the peripheral portion 152. The outer wall of the circumferential flange 154 and sized and shaped to snugly fit within the circumference of the interior wall 32 of the top open end 36 of the body 12, and the peripheral portion 152 comprise a lip that has essentially the same size as the top open end 36 of the body 12 so that the body 12 with abut the lip of the peripheral portion 152 when the circumferential flange 154 of the collar 114 is inserted within the top open end 36 of the body 12. The inner surface of the circumferential flange 154 comprises threads 116 for attachment to a threaded portion of a cover or the like.

Figure 24:
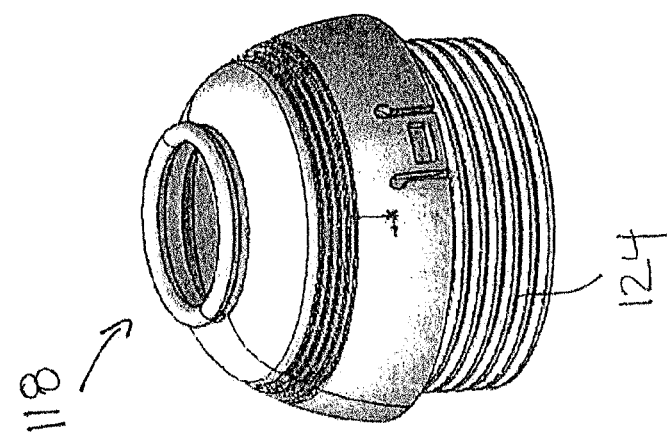
FIG. 24 is a perspective view of a neck according to an embodiment of the invention.

With reference to FIG. 24, a threaded neck 118 is shown. The threaded neck 118 is sized and shaped to be received by the collar 114. The threaded neck 118 comprises external threads 124 to engage the threads 116 of the inner flange of the collar 114.

Figure 25:
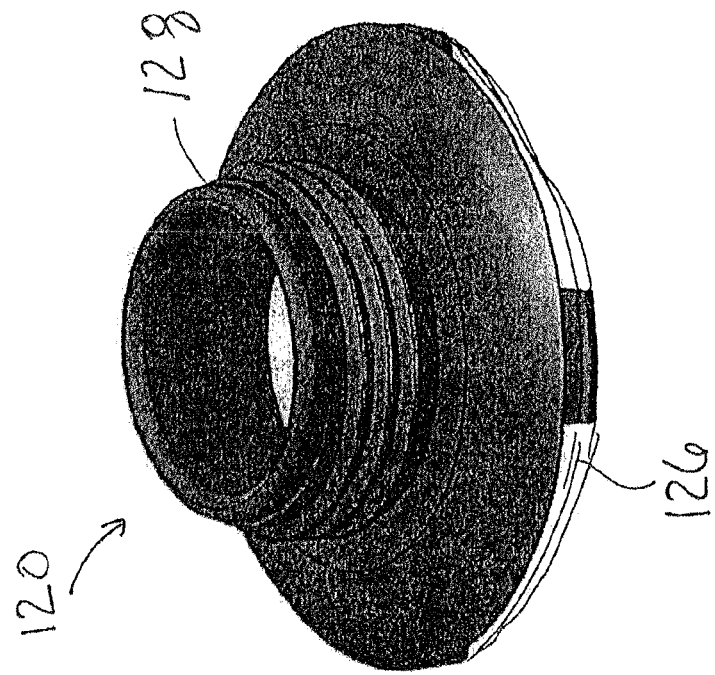
FIG. 25 is a perspective view of a neck according to another embodiment of the invention.

With reference to FIG. 25, a threaded neck 120 is shown. The threaded neck 120 is sized and shaped to be coupled with the collar 114 and to facilitate drinking or poring. The threaded neck 120 comprises external threads 126 to engage the threads 116 of the inner flange of the collar 114.

Example 6

With reference to FIGS. 26 to 28, another embodiment of a composite container 300 is shown. The container 300 includes a hollow body 222, a liner 14, a funnel shaped collar 122, a base 19, a bottom framing element (20, 20a), a bottom liner 22. The container includes a liner 14, a base, 19, a bottom, a framing element (20, 20a), and a bottom liner 22 as described above. The method of construction and of dissembling as the containers is generally as described above in Example 2. The variants in container 300 are described below.

Instead of a ring like collar (17, 17a) with a large opening, composite container 300 includes a funnel shaped neck 122. The neck 122 which resembles the top of a wine bottle facilitates poring of the content held within the container. The neck 122 is sized and shaped to be coupled with the top open end of the hollow body 222 coupled with its liner 14. The neck 122 is coupled to the lined body (14, 222) is the same manner as described above. The hollow body 222 includes a second external layer size to correspond to the width of the portion of the neck 122 that hangs over the first layer of the hollow body 222 and the peripheral lip 94 of the base 19. The second external layer of the hollow body 222 serves to create a uniform and flush outer surface. The upper portion of the neck can comprise external screw-threads to receive a screw cap. Alternatively, the neck can be closed off using a cork.

Although the invention has been described with reference to certain specific embodiments, various modifications thereof will be apparent to those skilled in the art without departing from the spirit and scope of the invention. All such modifications as would be apparent to one skilled in the art are intended to be included within the scope of the following claims.

What is claimed is:

1. A composite container comprising:
    a paperboard hollow body having top and bottom open ends, the body is formed by a sidewall having inner and outer surfaces,
    a sidewall liner extending peripherally about the inner surface of the body forming a lined body, the sidewall liner is temporarily bonded to the body;
    a base removably connectable to the bottom open end of the lined body, the base comprises a peripheral portion that abuts the bottom end of the lined body and a sidewall that fits in the bottom open end of the lined body, the sidewall of the base is bonded to a bottom portion of the sidewall liner, and
    a collar removably connectable to the top open end of the body, the collar comprises a peripheral portion that abuts the top open end of the body and an inner circumferential flange that fits in the top open end of the body, the inner circumferential flange is bonded to a top portion of the sidewall liner,
    thereby allowing disconnection of the bonded base, the sidewall liner and the collar from the body.

2. The composite container of claim 1, wherein the peripheral portion of the collar comprises regions of weakened strength so that a section of the peripheral portion that abuts the top open end can be removed, thereby allowing the bonded collar, the sidewall liner and the base to be more easily removed from the hollow body.

3. The composite container of claim 1, wherein the base comprises regions of weakened strength so that the portion of the base that abuts the bottom end of the body can be removed, thereby allowing the bonded base, the sidewall liner and the collar from the hollow body.

4. The composite container of claim 1 further comprising a bottom liner bonded to the base and the sidewall liner forming a hermetically sealed cavity.

5. The composite container of claim 1, wherein the collar further comprises an outer flange.

6. The composite container of claim 5, wherein the inner circumferential flange, the peripheral portion and the outer flange form a U-shaped cross-section that clamps the top open end of the hollow body.

7. The composite container of claim 1, wherein the inner circumferential flange has a circumferential ridge.

8. The composite container of claim 1 further comprising a bottom liner bonded to a framing element and the sidewall liner creating a hermetically sealed cavity.

9. The composite container of claim 1 further comprises a top liner bonded to the collar.

10. The composite container of claim 1, wherein the collar comprises a U-shape cross-section that frictionally couples the top open end of the lined body to the collar.

11. The composite container of claim 1 further comprises a lid.

12. The composite container of claim 1, wherein the collar is funnel shaped.

13. The composite container of claim 1, wherein the circumferential flange comprises threads.

14. A composite container comprising:
    a paperboard hollow body having top and bottom open ends, the body formed by a sidewall having inner and outer surfaces,
    a sidewall liner extending peripherally about the inner surface of the body forming a lined body, the sidewall liner is temporarily bonded to the body;
    a base connectable to the bottom open end of the lined body, the base comprises a peripheral portion that abuts the bottom end of the lined body and a sidewall that fits in the bottom open end of the lined body, the sidewall of the base is bonded to a bottom portion of the liner, and a collar connectable to the top open end of the body, the collar comprises a peripheral portion that abuts the top open end of the body and an inner circumferential flange that fits in the top open end of the body, the inner circumferential flange is bonded to a top portion of the liner.

15. The composite container of claim 14, wherein the collar further comprises an outer flange.

16. The composite container of claim 15, wherein the inner circumferential flange, the peripheral portion and the outer flange form a U-shaped cross-section that clamps the top open end of the hollow body.

17. The composite container of claim 14, wherein the inner circumferential flange has a circumferential ridge.

18. The composite container of claim 14 further comprising a bottom liner bonded to a framing element and the sidewall liner creating a hermetically sealed cavity.

19. The composite container of claim 14 further comprises a top liner bonded to the collar.

20. The composite container of claim 14, wherein the collar comprises a U-shape cross-section that frictionally couples the top open end of the lined body to the collar.

21. The composite container of claim 14 further comprises a lid.

22. The composite container of claim 14, wherein the collar is funnel shaped.

23. The composite container of claim 14, wherein the circumferential flange comprises threads.

* * * * *